(12) United States Patent
Hardy et al.

(10) Patent No.: US 8,099,467 B2
(45) Date of Patent: Jan. 17, 2012

(54) SYSTEM, METHOD, AND USER INTERFACE FOR SEARCHING FOR MESSAGES WITH ATTACHMENTS ON A MOBILE DEVICE

(75) Inventors: Michael Thomas Hardy, Waterloo (CA); Andrew Douglas Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 392 days.

(21) Appl. No.: 11/554,940

(22) Filed: Oct. 31, 2006

(65) Prior Publication Data

US 2007/0250583 A1    Oct. 25, 2007

Related U.S. Application Data

(63) Continuation-in-part of application No. 11/407,219, filed on Apr. 20, 2006.

(51) Int. Cl.
*G06F 15/16* (2006.01)
*G06F 7/00* (2006.01)
*G09G 5/00* (2006.01)

(52) U.S. Cl. .............. 709/206; 707/3; 345/773

(58) Field of Classification Search ........... 709/206
See application file for complete search history.

(56) References Cited

U.S. PATENT DOCUMENTS

| | | | |
|---|---|---|---|
| 6,643,651 B1 * | 11/2003 | Pearsall | 707/10 |
| 6,934,738 B1 | 8/2005 | Furusawa et al. | |
| 6,983,310 B2 * | 1/2006 | Rouse et al. | 709/206 |
| 7,080,099 B2 * | 7/2006 | Tada et al. | 707/104.1 |
| 7,142,883 B2 * | 11/2006 | Rouse et al. | 455/552.1 |
| 7,369,260 B2 | 5/2008 | Buschi et al. | |
| 7,370,035 B2 | 5/2008 | Gross et al. | |
| 7,424,510 B2 | 9/2008 | Gross et al. | |
| 7,496,559 B2 * | 2/2009 | Gross et al. | 707/3 |
| 7,567,965 B2 * | 7/2009 | Giacobbe et al. | 707/9 |
| 7,593,991 B2 * | 9/2009 | Friedman et al. | 709/206 |
| 7,725,813 B2 | 5/2010 | Sylthe et al. | |
| 2001/0047389 A1 * | 11/2001 | Prahlad et al. | 709/206 |
| 2002/0161796 A1 | 10/2002 | Sylthe | |
| 2003/0055907 A1 | 3/2003 | Stiers | |

(Continued)

FOREIGN PATENT DOCUMENTS

EP    1182600    2/2002

(Continued)

OTHER PUBLICATIONS

European Search Report. Application No. 06112801.3 Date: Sep. 21, 2006.

(Continued)

*Primary Examiner* — Ashok Patel
*Assistant Examiner* — Joseph Gazda
(74) *Attorney, Agent, or Firm* — Bereskin and Parr LLP/S.E.N.C.R.L., s.r.l.

(57) ABSTRACT

Embodiments of a system, method, and user interface for searching for messages with attachments on mobile devices are disclosed. In one embodiment, a messaging application is programmed such that, in operation, a user is presented with a search screen in which the user may define search parameters for a search. A search parameter associated with an option to search for messages of a specified type is provided, and more specifically, an option to search for messages (e.g. electronic mail messages) having one or more attachments is made available to the user.

15 Claims, 14 Drawing Sheets

U.S. PATENT DOCUMENTS

| | | |
|---|---|---|
| 2003/0172118 A1 | 9/2003 | Bilansky et al. |
| 2003/0182378 A1 | 9/2003 | Treptow et al. |
| 2004/0068545 A1* | 4/2004 | Daniell et al. ................ 709/206 |
| 2004/0083271 A1 | 4/2004 | Tosey |
| 2004/0085360 A1* | 5/2004 | Pratt et al. .................... 345/773 |
| 2004/0133564 A1 | 7/2004 | Gross et al. |
| 2004/0143564 A1 | 7/2004 | Gross et al. |
| 2004/0143569 A1* | 7/2004 | Gross et al. ........................ 707/3 |
| 2005/0080863 A1 | 4/2005 | Daniell |
| 2005/0102361 A1* | 5/2005 | Winjum et al. ............... 709/206 |
| 2005/0144241 A1* | 6/2005 | Stata et al. .................... 709/206 |
| 2005/0193068 A1 | 9/2005 | Brown et al. |
| 2005/0257159 A1 | 11/2005 | Keohane et al. |
| 2006/0031340 A1 | 2/2006 | Mathew et al. |
| 2006/0031357 A1* | 2/2006 | Misra et al. ................... 709/206 |
| 2006/0069990 A1 | 3/2006 | Yozell-Epstein et al. |
| 2006/0095527 A1* | 5/2006 | Malik ........................... 709/206 |
| 2006/0101117 A1* | 5/2006 | Yabe et al. .................... 709/206 |
| 2006/0168543 A1* | 7/2006 | Zaner-Godsey et al. ..... 715/835 |
| 2006/0218234 A1* | 9/2006 | Deng et al. .................... 709/206 |
| 2006/0225001 A1 | 10/2006 | Sylthe et al. |
| 2007/0011258 A1 | 1/2007 | Khoo |
| 2007/0061308 A1* | 3/2007 | Hartwell et al. .................. 707/3 |
| 2007/0233791 A1* | 10/2007 | Sylthe et al. .................. 709/206 |
| 2008/0005247 A9 | 1/2008 | Khoo |
| 2008/0010350 A1* | 1/2008 | Chen et al. .................... 709/206 |
| 2008/0091787 A1 | 4/2008 | Wolfe |
| 2009/0100073 A1* | 4/2009 | Dargahi et al. ............... 707/100 |
| 2010/0287467 A1 | 11/2010 | Sylthe et al. |

FOREIGN PATENT DOCUMENTS

| | | |
|---|---|---|
| EP | 1847949 | 12/2009 |
| JP | 2006350772 A * | 6/2005 |

OTHER PUBLICATIONS

European Examination Report. Application No. 06112801.3. Dated: Feb. 7, 2008.

Co-pending U.S. Appl. No. 11/407,219, "Searching for Electronic Mail (Email) Messages with Attachments at a Wireless Communication Device", Filed Apr. 20, 2006.

European Examination Report. Application No. 06112801.3. Dated: Jul. 11, 2007.

European Communication under Rule 71(3) EPC. Application No. 06112801.3. Dated: Sep. 19, 2008.

United States Office Action. Co-pending U.S. Appl. No. 11/407,219. Dated: Jan. 21, 2009.

Terminal Disclaimer. Co-pending U.S. Appl. No. 11/407,219. Dated: Apr. 8, 2009.

Amendment. Co-pending U.S. Appl. No. 11/407,219. Dated: Apr. 8, 2009.

United States Final Office Action. Co-pending U.S. Appl. No. 11/407,219. Dated: Aug. 6, 2009.

Amendment. Co-pending U.S. Appl. No. 11/407,219. Dated: Oct. 14, 2009.

Request for Continued Examination (RCE). Co-pending U.S. Appl. No. 11/407,219. Dated: Oct. 14, 2009.

Office Action. Co-pending U.S. Appl. No. 11/407,219. Dated: Dec. 7, 2009.

Amendment. Co-pending U.S. Appl. No. 11/407,219. Dated: Mar. 4, 2010.

Canadian First Office Action. Application No. 2,566,778. Dated: Mar. 31, 2010.

Final Office Action. Co-pending U.S. Appl. No. 11/407,219. Dated: May 17, 2010.

Amendment. Co-pending U.S. Appl. No. 11/407,219. Dated: Aug. 3, 2010.

Request for Continued Examination (RCE). Co-pending U.S. Appl. No. 11/407,219. Dated: Aug. 3, 2010.

Office Action. Co-pending U.S. Appl. No. 11/407,219. Dated: Jan. 5, 2011.

Amendment/Response. Co-pending U.S. Appl. No. 11/407,219. Dated: Mar. 24, 2011.

Notice of Allowance. Canadian Application No. 2,566,778. Dated: Nov. 5, 2010.

Decision to grant a European patent pursuant to 97(1) EPC. European Application No. 06112801.3. Dated: Nov. 12, 2009.

Notice of Allowance, Co-pending U.S. Appl. No. 11/407,219. Dated: Jun. 27, 2011.

Co-pending U.S. Appl. No. 13/220,140, "System, Method, and User Interface for Searching for Messages With Attachments on a Mobile Device", filed Aug. 29, 2011.

* cited by examiner

SYSTEM, METHOD, AND USER INTERFACE FOR SEARCHING FOR MESSAGES WITH ATTACHMENTS ON A MOBILE DEVICE

CROSS-REFERENCE TO RELATED APPLICATION

This application is a continuation-in-part of U.S. patent application Ser. No. 11/407,219 filed Apr. 20, 2006, entitled SEARCHING FOR ELECTRONIC MAIL (E-MAIL) MESSAGES WITH ATTACHMENTS AT A WIRELESS COMMUNICATION DEVICE, the contents of which are herein incorporated by reference.

RELEVANT FIELD

Embodiments described herein relate generally to messaging applications for use with mobile devices, and more particularly to a system, method, and user interface for searching for messages (e.g. electronic mail messages) with attachments on a mobile device.

BACKGROUND

Electronic systems that "push" (i.e. automatically transmit) electronic mail ("e-mail") messages to wireless communication devices are well-known. In an exemplary system, an intermediary server monitors an "inbox" (typically, a folder or other store where incoming messages are stored) of an e-mail account at an e-mail server. When an e-mail message arrives at the monitored inbox, the intermediary server "pushes" the e-mail message to the wireless communication device (also referred to herein as a "mobile device") by way of a data network (such as the public Internet) and a wireless network. If the e-mail message has an attachment (i.e. a computer file that accompanies the e-mail message, such as a word processing file, image file or spreadsheet, for example), the intermediary server may refrain from automatically pushing the attachment to the device, and may instead await a user request for the attachment from the wireless communication device before transmitting some or all of the attachment to the device.

When an e-mail message having an attachment is pushed to the wireless communication device without the attachment, the fact that the message has an associated attachment may be indicated to the user by, for example, an icon displayed in association with the message. The appearance of the icon may also indicate the nature of the attachment (e.g. word processing file, image file, spreadsheet, etc.). If the user opts to view the attachment, by selecting the icon for example, a request for a first portion of the attachment may be automatically generated and transmitted via the wireless network to the intermediary server. The attachment service at the intermediary server may reformat the attachment for display on a small device screen or paginate the attachment to support piecemeal downloading of portions ("chunks") of the attachment as the user pages or otherwise scrolls up and down through the attachment using the attachment viewer. The attachment service may then transmit the first "chunk" of the attachment to the device. A chunk may, for example, be a two kilobyte (2 KB) portion of the processed attachment. The chunk may be displayed by the attachment viewer along with a "more" menu item. Selection of the "more" menu item may cause a request for another chunk to be sent to the intermediary server.

At any given time, the wireless communication device may store, in its local memory, numerous e-mail messages that have been "pushed" to the device. For e-mail messages having at least one attachment, the attachment may be resident in memory at the wireless communication device in whole, in part (e.g. in the form of one or more chunks), or not at all, depending upon whether or not it has been transmitted to the device, responsive to the user's interactions with the attachment viewer.

BRIEF DESCRIPTION OF THE DRAWINGS

For a better understanding of embodiments of the systems, methods, and user interfaces described herein, and to show more clearly how they may be carried into effect, reference will be made, by way of example, to the accompanying drawings in which.

DETAILED DESCRIPTION

Many known messaging applications are programmed to allow users to search for e-mail messages that contain specified text in various e-mail message fields (e.g. message body, subject field, addressee fields).

At least some embodiments of the systems, methods, and user interfaces described herein relate generally to mobile device messaging applications, and more specifically to messaging applications that provide users with improved search capabilities.

For example, in exemplary embodiments described herein, a search for messages with attachments may be initiated by a user, through a user interface provided by a messaging application executing on a mobile device.

The terms "mobile device" and "wireless communication device" are used interchangeably herein.

In one broad aspect, there is provided a method of searching for messages with attachments on a mobile device, the method comprising the steps of: displaying a plurality of search parameters in a search screen to a user, wherein one of said plurality of search parameters is associated with an option to search for messages of a specified type on the mobile device; receiving a request from the user to modify the value of the search parameter associated with the option to search for messages of a specified type; displaying a plurality of user-selectable message types in response to the request, wherein the plurality of user-selectable message types comprises a message type associated with messages having one or more attachments; determining whether the user has selected the message type associated with messages having one or more attachments; executing a message search; and displaying results of the message search in a search results screen, wherein messages having one or more attachments are identified by the message search where it is determined that the user has selected the message type associated with messages having one or more attachments at the determining step.

Features of these and other aspects, and of a number of embodiments of systems, methods, and user interfaces are described below.

Figure 1:
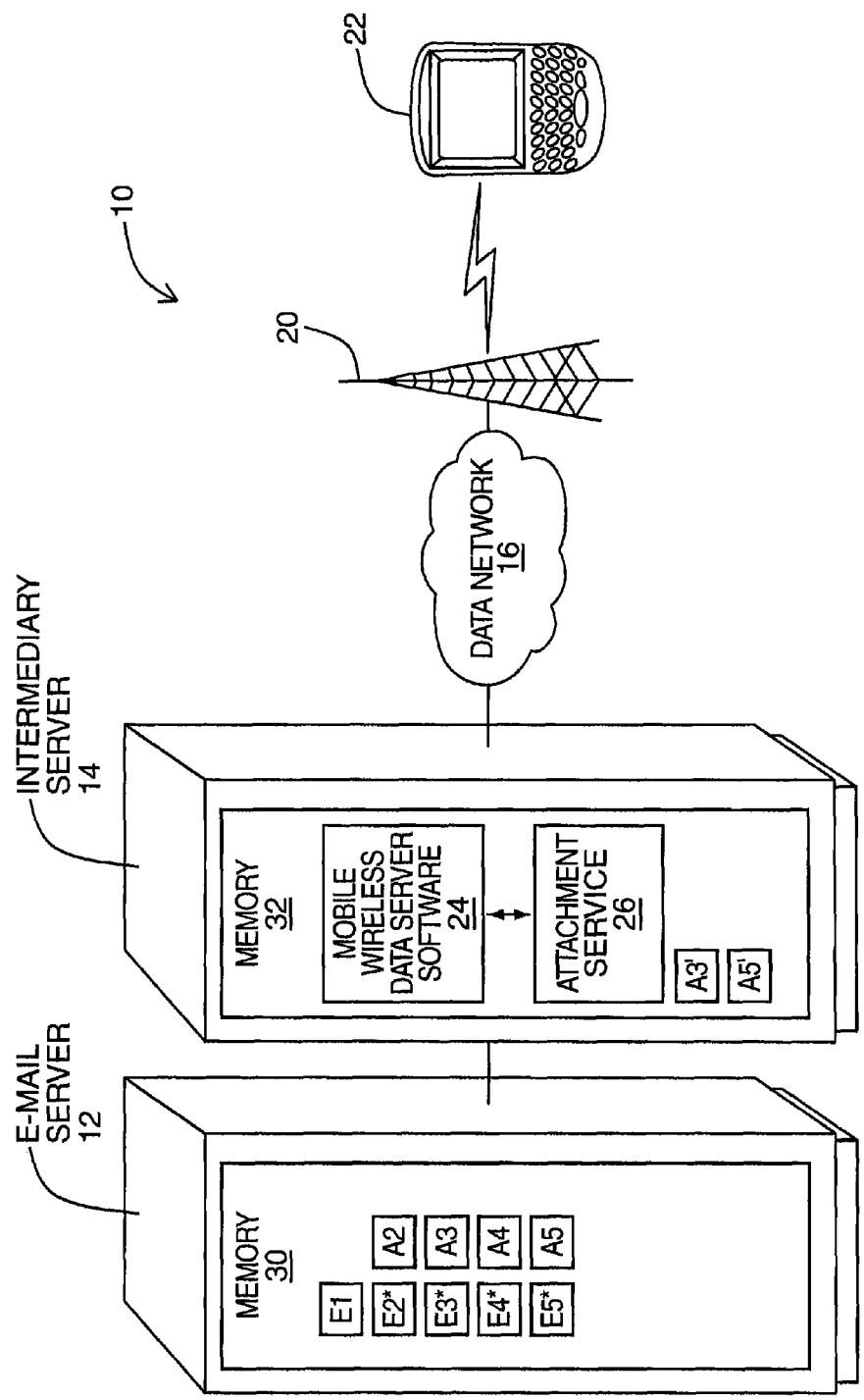
FIG. 1 is a schematic diagram illustrating a system that supports searching by e-mail attachments at a wireless communication device in one exemplary embodiment.

FIG. 1 illustrates an exemplary system 10 that supports searching by e-mail attachments at a wireless communication device. The system 10 is a modification of a conventional system that automatically transmits ("pushes") e-mail messages to wireless communication devices. As illustrated, system 10 includes an e-mail server 12, an intermediary server 14 having an attachment service 26, a data network 16, a wireless network 20 and a wireless communication device 22.

E-mail server 12 is a conventional server executing messaging and collaboration software such as Microsoft® Exchange Server, Lotus® Domino® Server or the like. E-mail server 12 may be designed to maintain multiple e-mail accounts, each of which has an inbox for incoming e-mail messages. E-mail server 12 includes memory 30 in addition to other conventional components such as a processor (the other components being omitted from FIG. 1 for brevity).

In FIG. 1, five exemplary e-mail messages E1, E2, E3, E4 and E5 are illustrated in memory 30. These e-mail messages have been received at an inbox of a single user's e-mail account. In FIG. 1, e-mail messages marked with an asterisk ("*") identify e-mail messages having at least one attachment. Specifically, as shown in FIG. 1, e-mail messages E2, E3, E4 and E5 each have a single attachment A2, A3, A4 and A5, respectively. In this example, attachment A2 is a zip archive, attachment A3 is a Microsoft® Word document attachment A4 is an MP3 music file and attachment A5 is an Adobe® Portable Document Format (PDF) document. The e-mail messages and attachments have been sent to the e-mail server 12 in the Multipurpose Internet Mail Extensions (MIME) format.

In one embodiment, intermediary server 14 executes two software applications, which intercommunicate during operation: the mobile wireless data server software 24 and the Attachment Service 26.

The mobile wireless data server software 24 is a software application that is responsible for "pushing" e-mail messages received at the inboxes of specified e-mail accounts of e-mail server 12 to the wireless communication device 22, in a conventional manner. The software 24 communicates with e-mail server 12 for purposes of monitoring the specified e-mail account inboxes.

In this example, when a new e-mail message is detected, the e-mail message is automatically converted to a format known as Compressed Multipurpose Internet Mail Extensions (CMIME), and transmitted to the wireless communication device 22 as a stream of bytes, via data network 16 (possibly through a firewall, not expressly illustrated in FIG. 1). In addition, the software 24 receives e-mail attachment requests from device 22 and intercommunicates with Attachment Service 26 for the purpose of obtaining the desired attachment (or a portion thereof, as discussed below) for transmission to the device 22, on an on-demand basis.

The Attachment Service 26 is a software application that processes e-mail attachments in preparation for their possible transmission to and presentation at a wireless communication device such as device 22.

The Attachment Service 26 intercommunicates with the mobile wireless data server software 24 for the purpose of handling requests for e-mail attachments, or portions thereof, from wireless communication devices such as device 22. A request for a portion of an attachment may be generated, e.g., when the user selects a "more" menu item within the attachment viewer to indicate a desire to display only a next portion of an attachment. When such a request is received, the Attachment Service 26 accesses the requested e-mail attachment directly from the e-mail server 12 and processes it. The result of this processing is a converted attachment that is optimized for wireless delivery to, and presentation by, wireless communication device 22. Conversion may involve breaking down the attachment in "chunks". The converted attachment is stored in memory 32 at the server 14. Only attachments that have been specifically requested and whose format is recognized are automatically converted.

For example, in the embodiment illustrated in FIG. 1, attachments A3 and A5 have recognized formats, and have been requested in whole or in part, thus they are converted and stored in memory 32 of intermediary server 14 as converted attachments A3' and A5', respectively (the "prime" symbol, "'" is used herein to denote converted attachments). Attachment A2, on the other hand, has not been requested (although its format is recognized) and has thus not been converted. Moreover, attachment A4 is not in a recognized format and has thus not been converted. Recognized attachment formats may, for example, include "electronic business card" attachments that are compatible with a personal information management (PIM) application at the wireless communication device 22, and other popular or standard formats, such as, for example, Microsoft® Word documents, Microsoft® Excel™ spreadsheets, Microsoft® PowerPoint™ presentations, Adobe® PDF documents, HyperText Markup Language (HTML) files, various image file formats (e.g. .wmf, .emf, .gif, .jpeg, .bmp, .png), .wav files, Zip archive and American Standard Code for Information Interchange (ASCII) files. The set of attachment formats that are currently recognized may be based upon the currently available set of conversion mechanisms provided by the Attachment Service 26. An attachment having a recognized format is referred to as a "recognized attachment". The Attachment Service 26 communicates with mobile wireless data server software 24 to coordinate the delivery of requested attachments or attachment portions to the wireless communication device 22 via data network 16 and wireless network 20.

Data network 16 is a conventional data network, which is used to transmit e-mail messages and requested e-mail attachments to wireless communication device 22. The network may deliver e-mail messages and attachments to a network operation centre (not illustrated), for purposes of relaying to the wireless network 20. The data network 16 also transmits requests for e-mail attachments in the opposite direction to the intermediary server 14. Data network 16 may be the public Internet or a privately managed and operated Internet Protocol (IP) network for example.

Wireless network 20 is a conventional wireless network, which serves as the final link in the communication chain between the intermediary server 14 and the wireless communication device 22. Network 20 may for example be a mobile data communication network, such as a Mobitex™, DataTAC™ or General Packet Radio Service (GPRS) mobile data communication network, or a conventional voice communication network, such as Advanced Mobile Phone Service (AMPS), Time Division Multiple Access (TDMA), Code Division Multiple Access CDMA, Personal Communications Service (PCS) or Global System for Mobile Communications (GSM), for example. Other types of data and voice networks, separate and integrated, could alternatively be utilized for network 20.

Wireless communication device 22 is a two-way radio frequency (RF) communication device having data communication capabilities, which has been modified from a conventional configuration in order to support searching by e-mail attachments, as described below. Wireless communication device 22 is illustrated in greater detail in FIG. 2, in respect of one exemplary embodiment.

Figure 2:
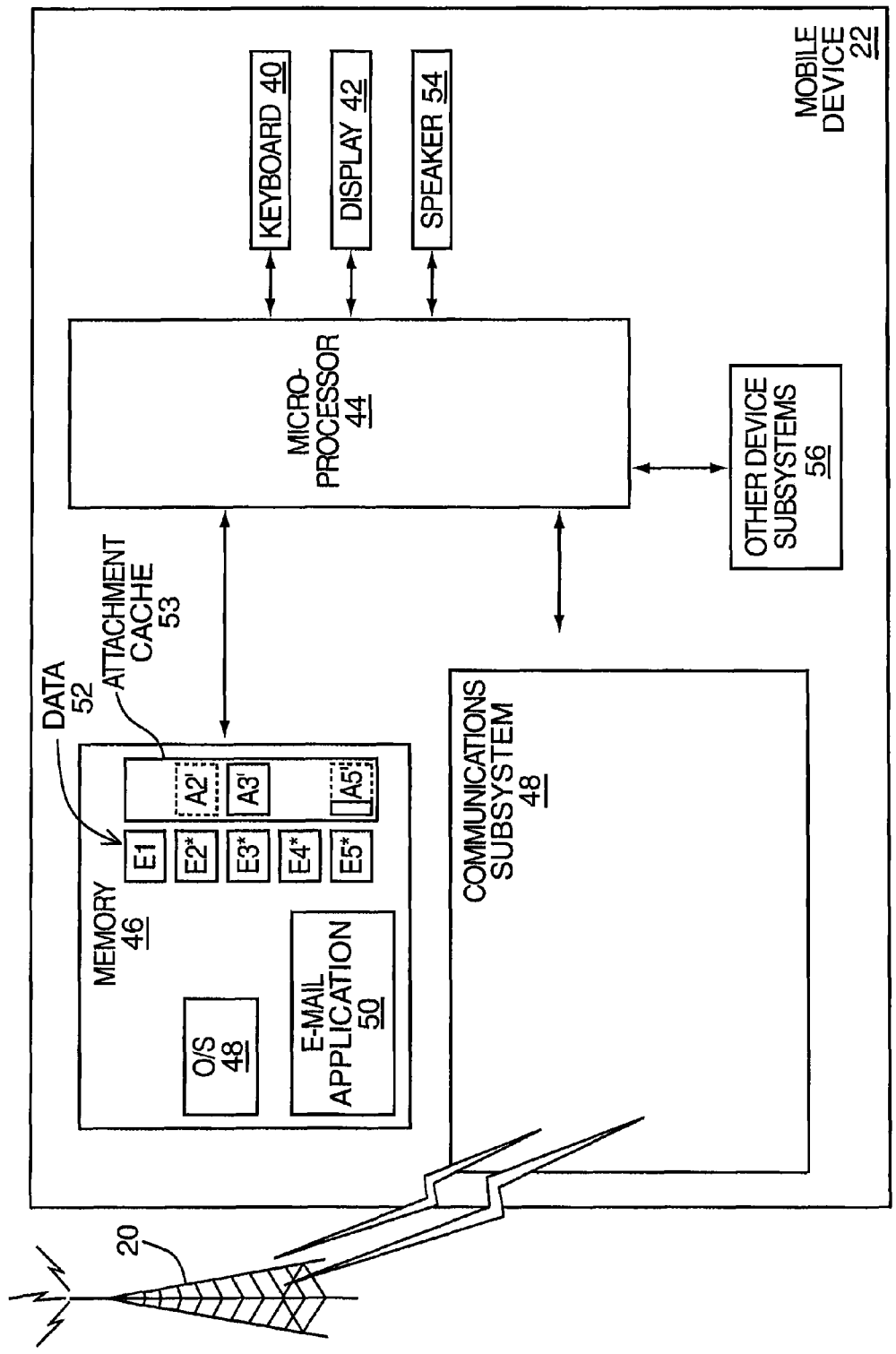
FIG. 2 illustrates a wireless communication device component of FIG. 1 in one exemplary embodiment.

Referring to FIG. 2, wireless communication device 22 includes a keyboard 40, a display 42, a microprocessor 44, memory 46 and a communications subsystem 48. The wireless communication device 22 will typically comprise other components, which have been omitted from FIG. 2 for brevity. The components shown are communicatively coupled as illustrated in FIG. 2.

Keyboard 40 is a user input device which permits a user of the wireless communication device 22 to enter text for such purposes as composing and sending e-mail messages or specifying criteria for searching locally stored e-mail messages for example. Other user input devices may also be provided, including a track wheel or track ball (not expressly shown in FIG. 2), for example.

Display 42 is an output device that is capable of presenting a graphical user interface (GUI) to a user. The display 42 may be a full graphic Liquid Crystal Display (LCD), for example. The display 42 is used to display e-mail messages and e-mail message attachments to the user. The dimensions of display 42 may be limited due to the limited overall size of the device 22.

Microprocessor 44 is a conventional processor which controls the overall operation of the wireless communication device 22 based on user actuation of keys on the keyboard 40, user input received through other input devices, and the receipt of data from wireless network 20, for example. The microprocessor 44 executes operating system software and application software that is stored in local memory 46. Microprocessor 44 is communicatively coupled (either directly or indirectly) to the keyboard 40, display 42, memory 46 and communication subsystem 48, as illustrated in FIG. 2.

Memory 46 stores various software and data used at the device 22, including operating system software 48, e-mail application 50 and data 52. Memory 46 may consist of flash memory, random access memory (RAM), read only memory (ROM), or a combination of these, for example. Typically, at least some of memory 46 will be persistent. It will be appreciated that memory 46 is a form of machine-readable medium.

Operating system software 48 is software that governs the basic operation of wireless communication device 22.

E-mail application 50 is a software application that is capable of managing and displaying e-mail messages and e-mail message attachments at device 22. The e-mail application 50 incorporates an attachment viewer component, which facilitates the viewing of recognized attachments. The application 50 is modified from a conventional e-mail application to support searching by e-mail attachments at device 22, as will be described. The application 50 may be one of many application software modules resident in memory 46 (not expressly illustrated). The application 50 includes machine-executable code. Where an e-mail application 50 is capable of managing other messages in addition to e-mails, it may also be referred to more generally as a messaging application.

Data 52 is data that is generated or used by e-mail application 50 at device 22. In the illustrated embodiment, data 52 includes five e-mail message objects. These objects corresponding to e-mail messages E1, E2, E3, E4 and E5 of FIG. 1, and are thus labeled with the same reference characters. Each of the e-mail messages objects of FIG. 2 is an instance of a Java object-oriented class representing an e-mail message of like name that has been "pushed" to the device by the intermediary server 14. Each e-mail message object is instantiated at the device upon the receipt of a CMIME byte stream representing that message from the intermediary server 14. E-mail messages marked with an asterisk (i.e. messages E2, E3, E4 and E5) in FIG. 2 have at least one associated attachment. As previously noted, the e-mail attachments are not "pushed" to the device 22, but rather are selectively provided to the device 22 by intermediary server 14 based upon user-initiated requests from the device 22. When attachments are provided to the device 22, in response to such requests, they are provided in chunks, as will be described. Depending on the user's actions, an attachment may be resident in memory 46 in whole, in part, or not at all.

In FIG. 2, the illustration of an attachment or a portion of an attachment with a solid line border indicates its presence in memory 46. In contrast, the illustration of an attachment or a portion of an attachment with a dashed line border indicates its absence from memory 46. From this notation, it will be apparent that attachment A2' is absent from memory 46; attachment A3' is wholly resident in memory; and attachment A5' is only partly resident in memory 46 (e.g. only one chunk of the attachment is resident in memory 46). The attachments reside in an attachment cache 53. Within the cache, each attachment is wrapped in a Java object that facilitates presentation of the attachment (i.e. presenting the attachment's content) at device 22.

It is noted that attachment A4 (FIG. 1) is not shown in memory 46 of FIG. 2 in solid lines or in dashed lines. This is due to the fact that the format of attachment A4 is unrecognized by the Attachment Service 26. Accordingly, the attachment has not been downloaded to the device 22, in this example.

Communication subsystem 48 is responsible for effecting data communications (and possibly voice communications) between the device 22 and the rest of system 10 via wireless network 20. Subsystem 48 may include such components as a receiver, a transmitter, one or more antennas, and a digital signal processor (none of which are expressly illustrated). The specific design and implementation of the communication subsystem 48 is dependent upon the communication network 20 in which the mobile device 22 is intended to operate.

The wireless communication device 22 also includes a speaker 54 and may further include various other device subsystems 56.

Figure 3:
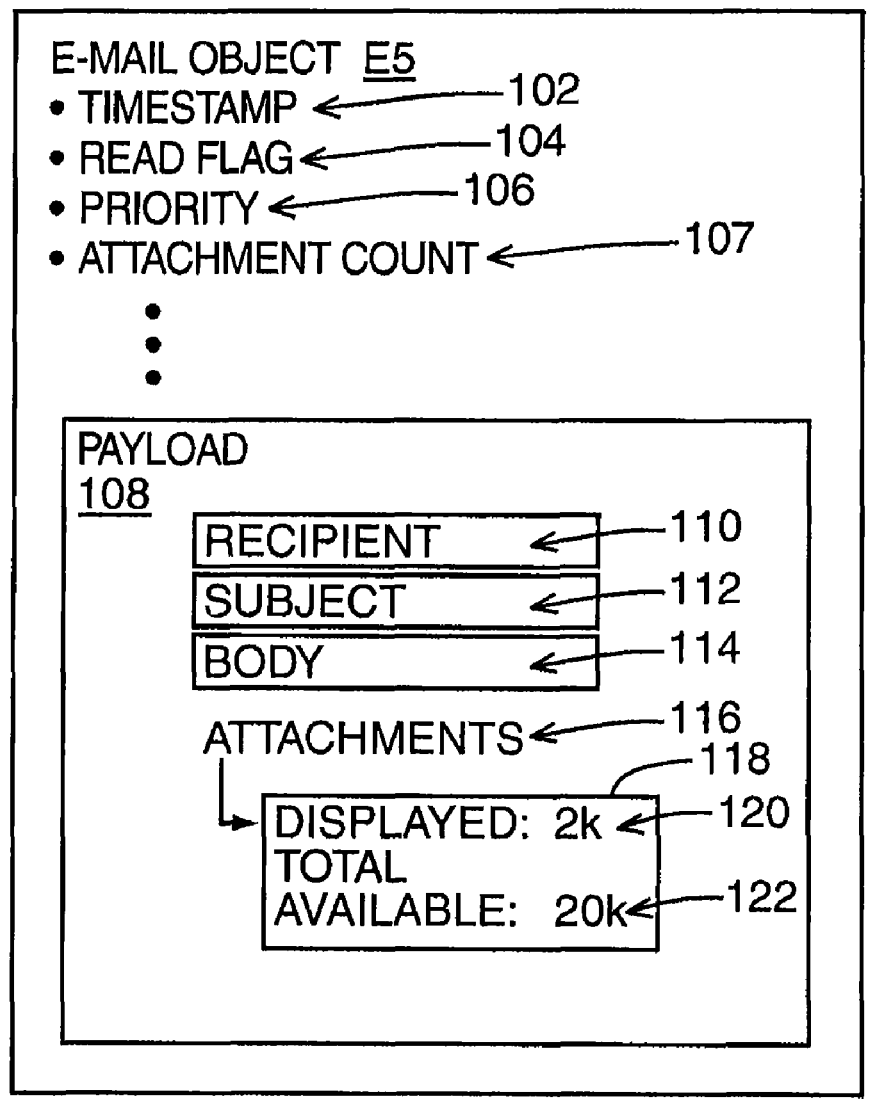
FIG. 3 illustrates an instance of an object-oriented class that is instantiated in the memory of the wireless communication device of FIG. 2 to represent an e-mail message in one exemplary embodiment.

FIG. 3 illustrates exemplary e-mail object E5 of FIG. 2 in greater detail. Each of e-mail messages E1, E2, E3, and E4 will have similar structure, with some differences that will be described herein.

As shown in FIG. 3, e-mail object E5 is an instance of an object-oriented Java class having various attributes, such as a timestamp (time of arrival) attribute 102, a read flag attribute 104 indicating whether or not the e-mail message has been read, a priority attribute 106 indicating e-mail message priority, and an attachment count 107 indicating the number of attachments of the represented e-mail message. Other attributes may be present but have been omitted from FIG. 3 for brevity.

The object E5 also contains a subordinate payload object 108. Payload object 108 is a container object containing various subordinate objects representing various other components of e-mail message E5. The subordinate objects include a message recipient object 110, a message subject object 112, a message body object 114 and a set of attachment objects 116.

Attachment objects 116 represent the attachments of e-mail message E5. The number of attachment objects 116 corresponds to the number of attachments in the e-mail message, as indicated by the attachment count attribute 107. If the e-mail message has no attachments, there will be no objects 116. In the example shown in FIG. 3, a single attachment object 118 is illustrated, reflecting the fact that e-mail message E5 has a single attachment. The attachment object 118 has various attributes. A first attribute 120 indicates how much of the attachment has been displayed at the device 22 using the attachment viewer. In one embodiment, a chunk is a 2 kilobyte (2 KB) portion of the attachment. A second attribute 122 indicates the total size of the attachment at the intermediary server 14 (FIG. 1). In the example shown in FIG. 3, the values of the first and second attributes cumulatively indicate that only the first chunk of the attachment of e-mail message E5 has been viewed, and that nine more chunks (i.e. 18 KB) that have yet to be displayed remain at the server 14.

In one embodiment, each attachment object of objects 116 implements one of two Java interfaces. If the represented attachment is in a format recognized by the Attachment Service 26, then the attachment object will implement a first Java interface referred to as the "recognized attachment interface". Otherwise, the attachment object will implement a second Java interface which is referred to as the "unrecognized attachment interface". In the former case, the recognized attachment interface effects a "content proxy" which acts as a pointer into the attachment cache 53 in which wrapped attachment content is stored. This arrangement separates representations of attachment content from representations of e-mail objects, so that attachments may be "cleaned up" or purged independently of e-mail messages. The determination of whether an attachment is in a recognized format is made on the basis of attachment information embedded within the CMIME byte stream that is transmitted to device 22 when the e-mail message is "pushed" to the device. The implementation of different Java interfaces on the basis of whether or not the attachment format is recognized facilitates run-time searching for e-mail messages having attachments. In particular, the identity of the implemented interface will indicate whether the e-mail message should or should not be displayed in a list of e-mail messages having attachments, as will be described.

Figure 4:
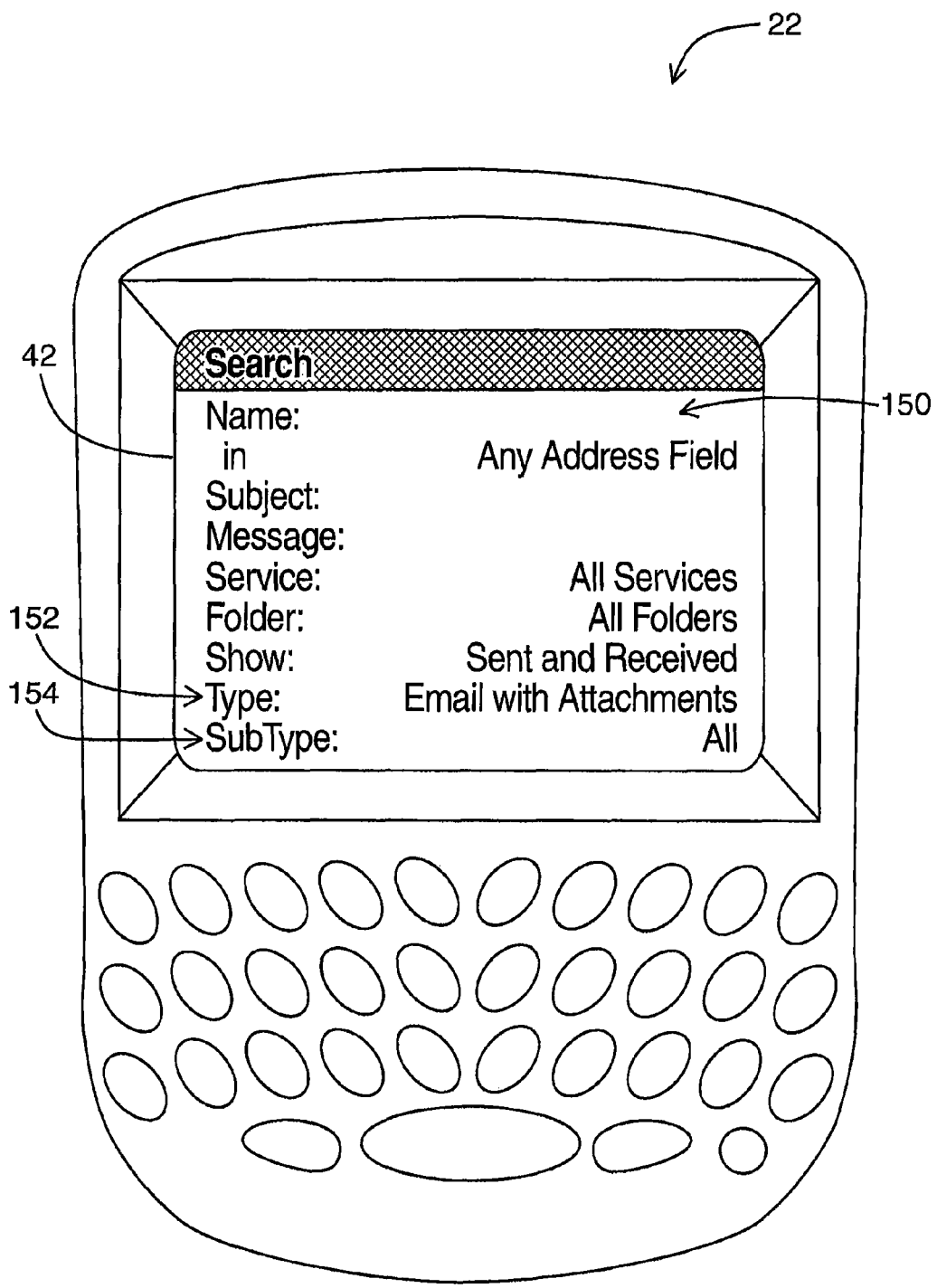
FIGS. 4 and 5 illustrate examples of screenshots of a graphical user interface provided on the wireless communication device of FIG. 2.

Referring to FIG. 4, a graphical user interface (GUI) screen 150 displayed on the display 42 of wireless communication device 22 is illustrated. The GUI screen 150 is presented by the e-mail application 50 (FIG. 2) upon the entry of user commands at device 22 indicating a desire to search e-mail messages (or other types of messages) stored at device 22 based on user-specified search parameters. The user may interact with GUI screen 150 to specify parameters for the search.

As illustrated in FIG. 4, search parameters that may be specified by a user of device 22 may include: text to be matched within a specified address field (such as the To:, From:, CC: or BCC: field of an e-mail message for example), subject line, or message body; a service (e.g. an e-mail account provider) by which the message was received; the identity of message containing folders within the specified service(s); and whether incoming messages, outgoing messages, or both should be searched. The search parameters also include a type parameter 152. In one embodiment, the search parameters may also include a subtype parameter 154.

Type parameter 152 allows the user to limit the search to only certain types of messages. This parameter may be set to specify such message categories as e-mail messages or Short Message Service (SMS) messages, for example, or to specify a subcategory within one of those categories.

In accordance with one embodiment, as shown in FIG. 4, the parameter 152 has been set to "E-mail with Attachments". This indicates that only e-mail messages with at least one recognized attachment should be returned by the search.

In accordance with another embodiment, subtype search parameter 154 may also be specified when the type search parameter 152 has been set to "E-mail with Attachments". The subtype search parameter 154 permits the search to be further narrowed as described below. To facilitate the setting of this parameter, a pop-up window 160 as shown in FIG. 5 is displayed.

Figure 5:
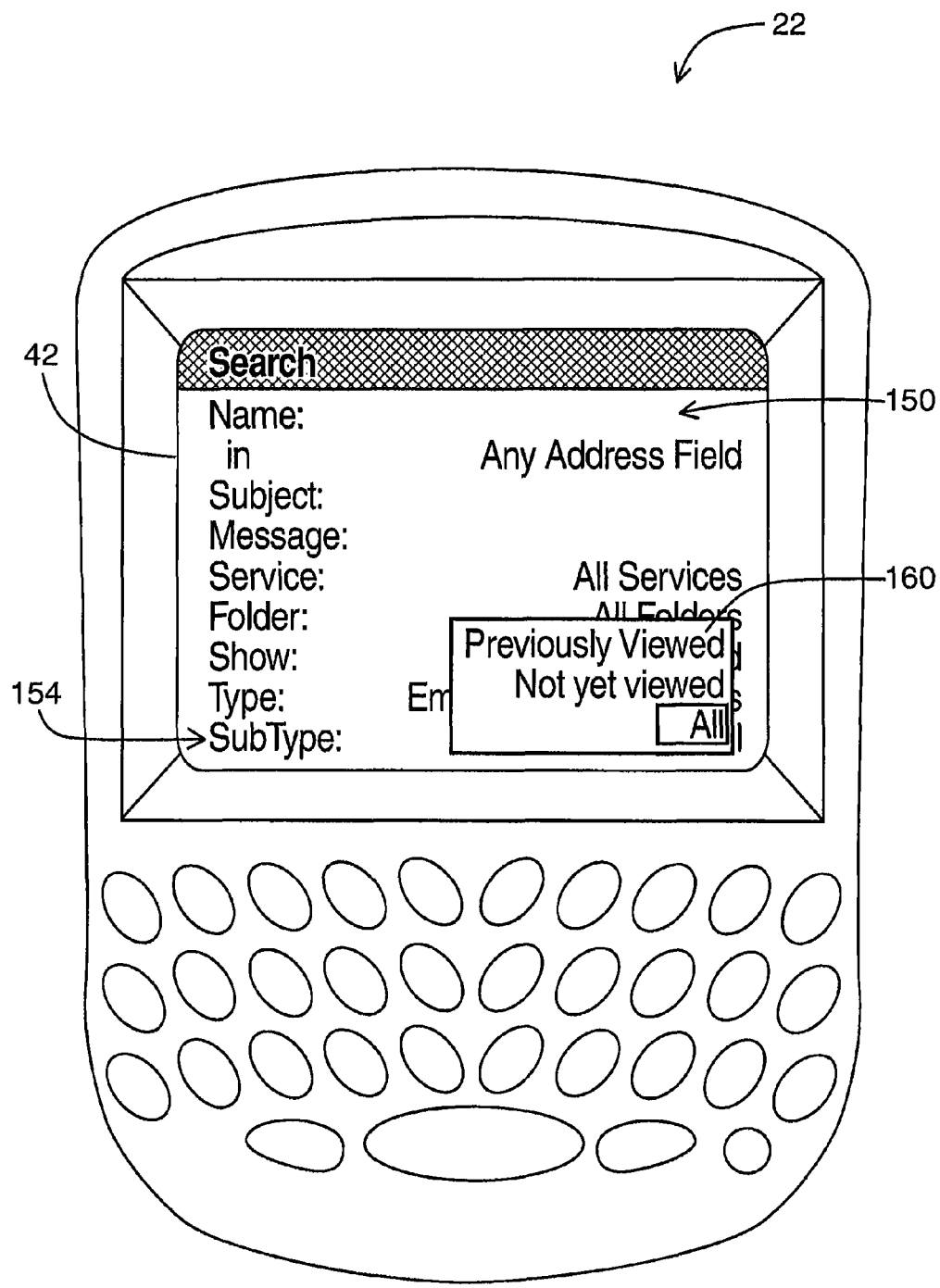

Referring to FIG. 5, pop-up window 160 for setting the subtype search parameter 154 lists three mutually exclusive options. The first option, "Previously Viewed", may be selected in order to indicate that only e-mail messages having at least one attachment whose content has been at least partially presented at the device 22 should be returned. A determination that an attachment as content has been at least partially presented at the device 22 is based on the value of an indicator maintained at the device 22 for each attachment. The value of the indicator indicates whether the attachment content has been at least partially displayed on display 42 or at least partially played on speaker 54. For example, the presence of at least one chunk of the attachment within attachment cache 53 (FIG. 2) on the device 22 may indicate that the content of the attachment has been at least partially presented. Alternatively, the "Displayed" attribute 120 of each attachment object associated with an e-mail message object may serve as the indicator; if any attribute 120 has a value greater than zero, that attribute's content will have been at least partially presented. Alternative embodiments may use other forms of indicators, such as flags for example, which are set to a particular value when an attachment's content is at least partially presented.

The second option, "Not Yet Viewed", is the converse of the "Previously Viewed" option. This option indicates that only e-mail messages whose attachment(s) has/have not been previously presented in whole or in part at the device 22 should be returned by the search. A determination that none of an e-mail message's attachments has been previously presented is also made on the basis of the indicator described above.

The third option, "All", indicates that all e-mail messages having at least one attachment should be returned, regardless of whether the attachment(s) has/have been presented in whole or in part.

It is noted that, in the embodiment where a search by subtype may be performed as described above, only attachments whose formats are recognized are considered to be "presentable" (i.e. to have presentable content) at the device 22. Only "presentable" attachments are returned by a search when search parameter 152 has been set to "e-mail with attachments", regardless of the option selected for search parameter 154. Alternative embodiments may permit any e-mail message having at least one attachment to be returned, regardless of whether the attachment is "presentable".

It is also further noted that the search parameters of screen 150 are cumulative. Thus, if search parameters other than parameters 152 and 154 are specified, they would also need to be met in order for a match to occur.

In operation, the arrival of e-mail messages E1-E5 at e-mail server 12 is detected by the intermediary server 14 (FIG. 1). The intermediary server 14 processes each of the e-mail messages, generating a CMIME byte stream for each e-mail message on the basis of the received message content. For each e-mail message having one or more attachments, the generated CMIME byte stream includes a single "header" for each attachment. For each attachment having a format that is recognized by the Attachment Service 26 (e.g. attachments A2, A3 and A5 of FIG. 1), the header will indicate that the format is recognized and will specify certain attachment parameters, such as the name of the attachment, its size and its content type. For each attachment having an unrecognized format (such as the attachment associated with e-mail message E4), the associated header will indicate the fact that the format is unrecognized and will indicate only the name of the attachment. For each e-mail message that lacks any attachments (such as e-mail message E1), the corresponding byte stream will lack any such header. The byte streams are transmitted to the wireless communication device 22 conventionally by the intermediary server 14 according to the "push" procedure.

At the wireless communication device 22, the byte stream associated with each e-mail message E1-E5 is received by the communications subsystem 48 and is relayed to the e-mail application 50 in a conventional manner. The e-mail application 50 processes each byte stream and instantiates a corresponding e-mail object, similar to e-mail object E5 of FIG. 3, on the basis thereof, for each byte stream. If the byte stream lacks any headers (e.g. as for e-mail message E1), the instantiated e-mail object will not have any subordinate attachment objects 116 (FIG. 3). If the byte stream includes a header representing a recognized attachment (e.g. as for e-mail messages E2, E3 and E5), the header is "wrapped" in an object that implements the recognized attachment interface resulting in a subordinate attachment object 118 representative of that recognized attachment. If the byte stream includes a header representing an unrecognized attachment (e.g. as for e-mail message E4), the header is "wrapped" in an object that implements the unrecognized attachment interface, resulting in a subordinate attachment object representative of that attachment.

At this stage, a user of device 22 may enter commands to cause e-mail application 50 to display a representation (e.g. a list) of messages stored locally at the device, including e-mail messages and possibly other types of messages (e.g. SMS messages). Each e-mail message E1-E5 in the list may be represented as a list entry in the message list. Each entry may include an icon (such as an envelope icon) along with a time of receipt of the message, a sender ID, and a subject. For each of e-mail messages in the set of e-mail messages E2-E5, a further visually distinguishing characteristic, such as an associated attachment icon, may indicate that the message has at least one attachment.

The user may enter appropriate commands at the device 22 to indicate a desire to view a first chunk of the attachment associated with e-mail message E5 (i.e. attachment A5, or more specifically, converted attachment A5') using the attachment viewer. This results in the automatic generation of a request for the first 2 KB chunk of the attachment, which request is transmitted via the wireless network 20 and data network 16 to the intermediary server 14. The Attachment Service 26 may respond by engaging in processing to convert the attachment into chunks, e.g. of 2 kilobytes, that are suitable for presentation at the device 22, (as previously described), and transmitting the first 2 KB chunk of the converted attachment A5' to the device 22. This chunk is stored in attachment cache 53 (FIG. 2), after being wrapped in a Java object that facilitates presentation of the attachment content at the device 22. The content proxy object of the relevant object that implements the recognized attachment interface is configured to point to the "wrapped" chunk. The chunk may then be displayed by the attachment viewer along with a "more" menu item for requesting additional chunks. If more chunks were requested, they would be added to the existing content in the "wrapper" Java object in the attachment cache 53. In this example, it is assumed that the user does not select the more menu item, but rather navigates back to the message list after viewing the first chunk.

The user now may further enter appropriate commands at the device 22 to indicate a desire to view all chunks of the attachment associated with e-mail message E3 (i.e. attachment A3). In particular, the user may interact with the device 22 to cause each chunk of the attachment A3' to be downloaded. Alternatively, the attachment may have a format (content type) which requires the attachment to be downloaded as a whole, e.g. because the entirety of the content is required in order to present the attachment content at the device 22 (e.g. certain image or audio files). The Attachment Service 26 may respond by transmitting each chunk in turn or the attachment as a whole to the device 22 for display in the attachment viewer. The downloaded attachment content is "wrapped" and stored in attachment cache 53, as described above.

At some later point in time, the user of wireless communication device 22 may, for example, wish to search for e-mail messages having at least one attachment whose content has been at least partially presented at the device. The rationale for such a search may be a desire to identify candidate e-mail messages for deletion in order to free device memory 46. The user enters suitable commands at device 22 to cause e-mail application 50 to present GUI screen 150 as shown, for example, in FIG. 4. The user sets the type parameter 152 to "e-mail with attachments", and in this example, the subtype parameter 154 to "previously viewed". No other search parameters are specified in the example described with reference to FIGS. 4 and 5 (although additional search parameters could be specified, if desired).

When the search is triggered, each of e-mail objects E1-E5 is examined in turn to identify a subset of e-mail messages matching the user-specified search parameters. For each e-mail object having at least one subordinate attachment object within the set of attachment objects 116 that is recognized (i.e. that implements the recognized attachment interface) and having an associated indicator indicating that the attachment content has been at least partially presented at the device 22, the represented e-mail message is considered to be a match. Accordingly, the search results, which are a representation of the subset such as a list, will include an entry for each such message. In the present example, e-mail messages E3 and E5 would be represented, since at least a portion of at least one attachment of these messages has been presented. In contrast, e-mail message E2 would not be represented, since the user has not viewed any portion of the attachment for that e-mail message. E-mail message E4 would also not be represented in the search results because its attachment has an unrecognized format.

The user may later wish to search for e-mail messages having at least one attachment but having no attachment whose content has been presented in whole or in part. The rationale behind such a search may be a desire to identify as-yet unread e-mail correspondence. In this case, the user sets the type parameter 152 to "e-mail with attachments" and changes the subtype parameter 154 to indicate "not yet viewed". When the search is triggered, each of e-mail objects E1-E5 in memory 46 is again examined to identify a subset of e-mail messages matching the user-specified search parameters. For each e-mail object having one or more subordinate attachment objects within the set of attachment objects 116 that implement the recognized attachment interface, the represented e-mail message is considered to be a match and thus a member of the subset. In the present example, only e-mail message E2 would be represented in the generated search results, since it is the only one whose attachment has not yet been viewed in whole or in part. E-mail message E4 is again not represented in the search results because its attachment has an unrecognized format.

If the user returns to the GUI screen 150 and changes the subtype parameter 154 to indicate "all" without changing any other search parameters, the search results would list each e-mail message at device 22 having at least one attachment whose format is recognized, regardless of whether the attachment content has been viewed. These search results are a union of the e-mail messages returned by the first search and the e-mail messages returned by the second search described above, by way of example. In the example described above, e-mail messages E2, E3, and E5 would be represented in the resulting search results.

In variant embodiments, the user may not be provided with the option to search by subtype. In this case, the default subtype "all" would be automatically applied in the execution of any search.

It is noted that, due to limited memory at the device 22 of some embodiments, the processor 34, under control of operating system 48, may periodically engage in memory management processing to purge memory 46 as it nears its full capacity. In this case, previously viewed attachment chunks within attachment cache 53 may be purged from memory 46. Following such purging, the attachment may still be considered to have been previously viewed however, despite the absence of any chunks in attachment cache 53. To facilitate such operation, the attribute 120 for each attachment may be utilized. Alternatively, a flag may be set for each e-mail message in such embodiments to indicate whether any attachment has been at least partially presented, regardless of the presence or absence of attachment chunks in memory 46.

In variant embodiments, attachments may be automatically converted into a form that is optimized for wireless delivery to, and presentation by, wireless communication device 22 immediately following their arrival at e-mail server 12, rather than upon receipt of a request from the device 22 for at least a chunk of the attachment.

In variant embodiments, the search may only return e-mail messages having at least one attachment for which at least one chunk of the attachment resides in attachment cache 53. This type of search would not include e-mail messages which have been at least partially presented but whose chunk(s) have been purged from memory.

It will be understood that variant embodiments may employ chunks of sizes other than 2 KB as described above in respect of one example (e.g., 4 KB, 10 KB, 50 KB, 1 MB, etc.)

A further example that illustrates a number of features of at least one embodiment, is now provided with reference to FIGS. 6A to 6G, in which a user searches for all e-mail messages having attachments and for which details are shown in a message list. This may allow users to quickly locate specific e-mail messages of interest, for example.

Consider the situation where a user knows that he has received an important message, and where he knows that message contains an attachment. It may be difficult to locate this message in a message list if the number of messages for which details are shown in the message list is large. Allowing users to search for messages with attachments and having those messages identified in a list of messages returned as a result of a search may facilitate easier identification of the desired message.

Referring to FIGS. 6A to 6H, further examples of screenshots of a graphical user interface provided by an application executing on the wireless communication device of FIG. 2 in one exemplary embodiment are shown. In this embodiment, the application executing on the mobile device is a messaging application.

Figure 6A:
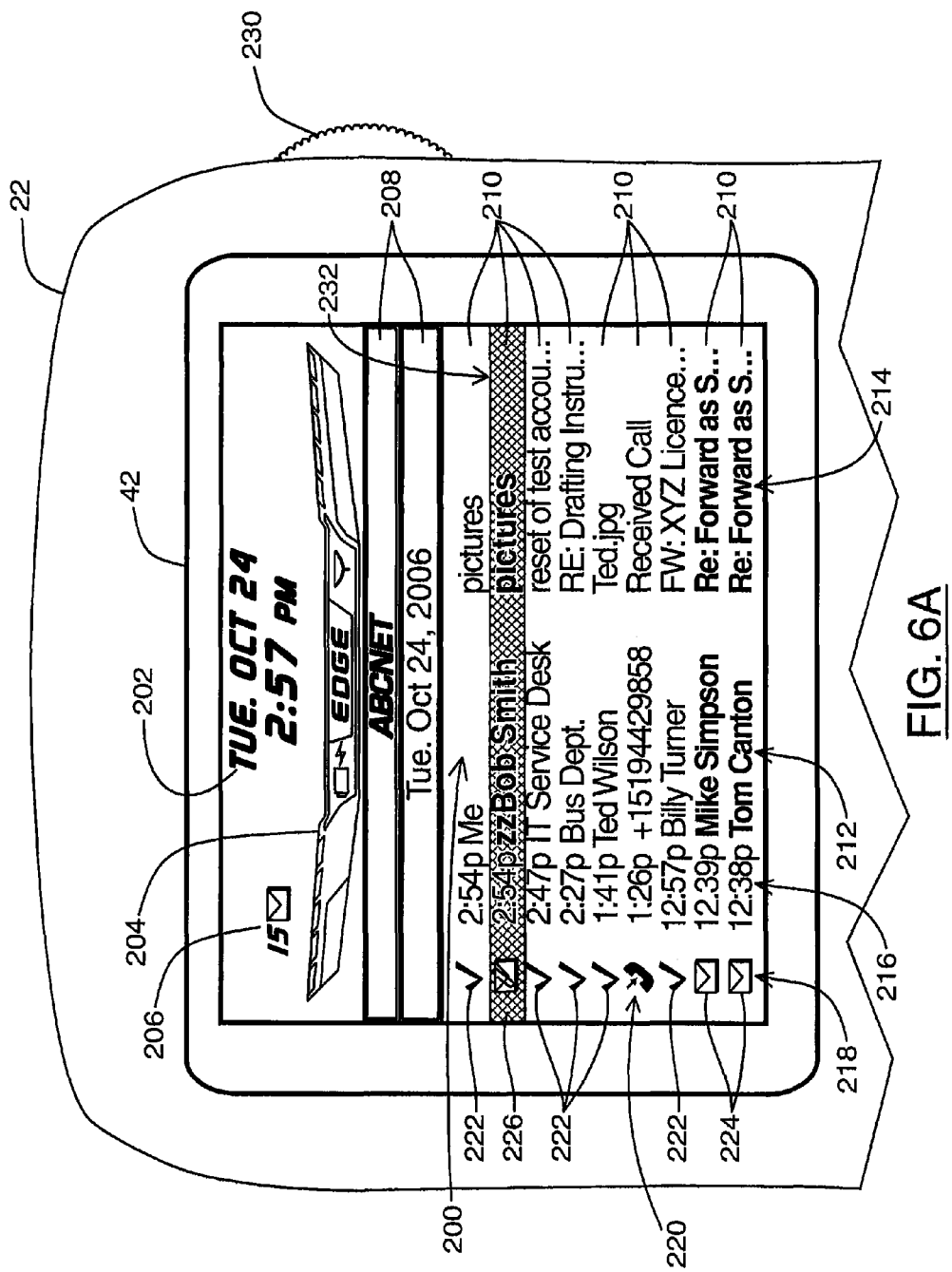
FIGS. 6A to 6H illustrate further examples of screenshots of a graphical user interface provided on the wireless communication device of FIG. 2.

In FIG. 6A, a message list 200 displayed by the messaging application in a display 42 of device 22, in a message list view, is shown.

In this view, details such as, for example: the current time and date 202; battery strength, signal strength, or other network details 204; an indicator 206 of the number of messages in message list 200 that have not yet been read; and one or more banners 208 that may be used to display date, network, user identification, device identification data or other data.

In this example, message list 200 comprises multiple list entries 210, where each message that has been received by the user at the device 22 and stored in the user's inbox folder ("inbox") is associated with one of the list entries 210. Each list entry 210 in the message list 200 provides details of the message associated with the respective list entry 210. Other list entries 210 in the message list 200 may exist, but which are not displayed in display 42 due to space restrictions. Accordingly, the messaging application will typically allow users to scroll up and down through message list 200 to examine all list entries 210 in message list 200.

The details that are to be provided by the list entries 210 of message list 200 may be configurable by the user. Message list 200 permits users to, for example, browse through a summary of messages received at device 22, and select messages of interest for opening so that the contents of the message may be read or otherwise managed at the device 22.

With respect to messages received at the device, the details provided by a list entry 210 may be extracted from the message header of the message associated with the list entry 210, such as the name of the sender or recipient of a sent message that may be displayed in a detail column 212, and the subject of the message that may be displayed in a detail column 214, for example. Other details may also be provided, including for example, the time the message was received at the device that may be displayed in a detail column 216, or an icon indicating whether or not the message has been opened ("read") by the user or whether or not the sending of a message has been completed in a detail column 218.

Other details relating to other data (e.g. telephone calls that are placed and received from the device) may also be integrated into the message list, with data provided in detail columns 212 to 218. For example, list entry 220 as shown in FIG. 6A provides details of a call received at the device 22.

In one embodiment, different icons are used to indicate whether a received message has been read, and whether a message has been sent.

For example, a check mark 222 can be used to indicate that the message associated with the corresponding list entry 210 has been sent.

An unopened envelope icon 224 can be used to indicate that the message associated with the corresponding list entry 210 has not yet been read. In one embodiment, the list entry 210 may also be highlighted (e.g. to indicate a high priority message).

Similarly, an opened envelope icon (not shown in FIG. 6A) can be used to indicate that the message associated with the corresponding list entry 210 has been read.

A paperclip graphic may also be displayed in combination with an envelope icon (e.g. opened, unopened) as shown at 226, to indicate that the message associated with the corresponding list entry 210 has at least one attachment associated with it.

The user may use a track wheel 230 on device 22, where provided, to manipulate a highlight bar 232 in display 42. The highlight bar 232 may be manipulated using a different input mechanism (e.g. track ball, keyboard) in some implementations.

By rotating track wheel 230, highlight bar 232 may be re-positioned to highlight different list entries 210 of message list 200. Once the user identifies a specific list entry, by manipulating the track wheel 230 so that the highlight bar 232 settles on that specific list entry, the user may then take further action in respect of the message associated with that list entry or take some other general action. For example, the user may click the track wheel 230 to reveal an option menu 240, as shown in FIG. 6B.

Figure 6B:
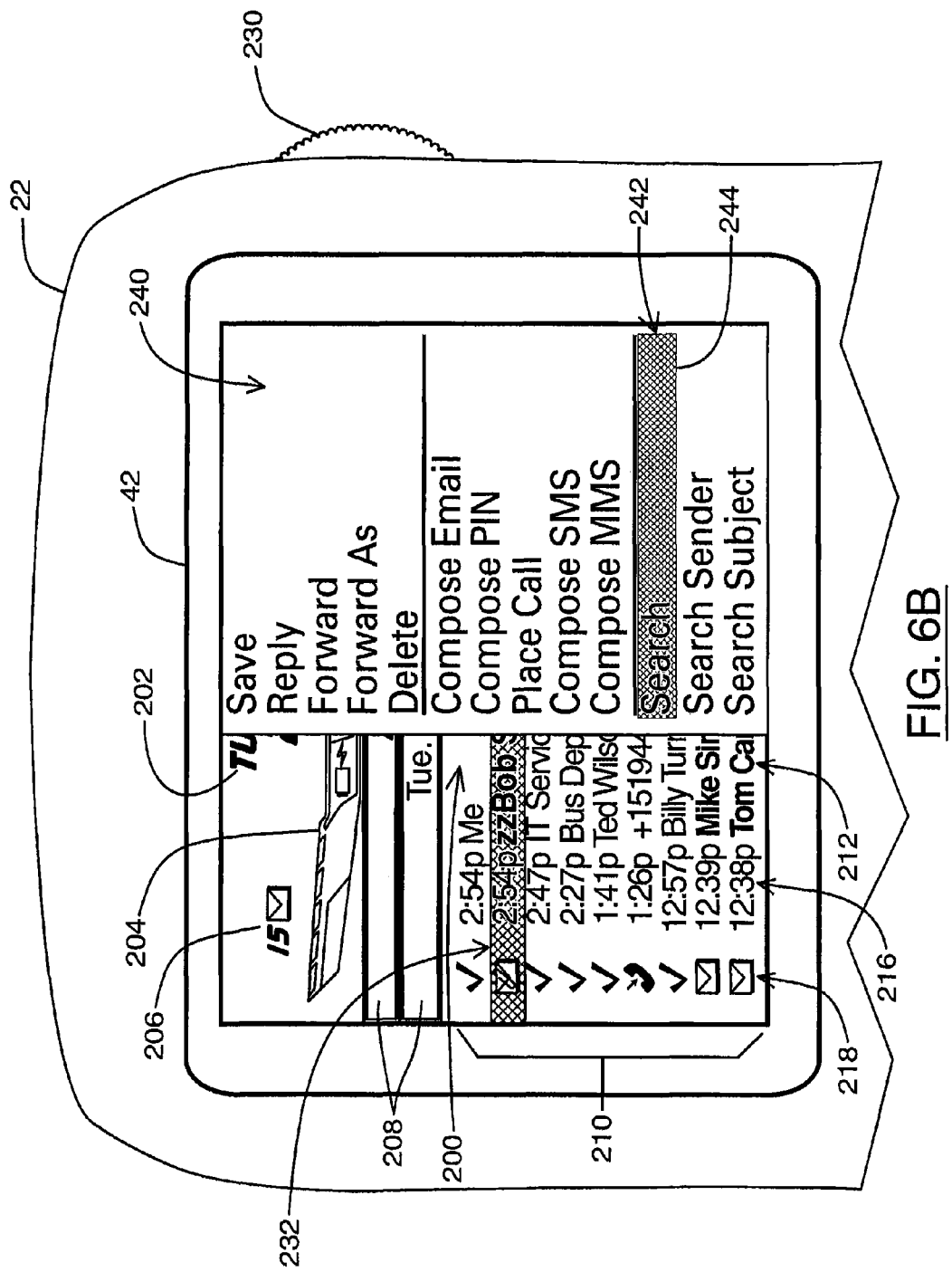

Referring to FIG. 6B, when option menu 240 is shown, by rotating track wheel 230, a second highlight bar 242 may be re-positioned to highlight different options within option menu 240. In this example, option menu 240 provides different options that allow users to perform certain operations on the selected message, and/or to perform operations not specific to the selected message.

For example, options that may be selected by the user from option menu 240 may allow the user to: obtain help, open the selected message, file the selected message in a specific folder, mark the selected message as unopened, save the selected message in a saved message folder, reply to the selected message, forward the selected message, delete the selected message, compose a new e-mail message, compose a new PIN message, place a call, compose a Short Message Service (SMS) message, compose a Multimedia Message Service (MMS) message, perform a general search for messages (as described herein), perform a specific search for messages from a particular sender, perform a specific search for messages with a particular subject, view the contents of a particular message folder, view the contents of the saved messages folder, configure device options, reconcile messages with those saved on a server, and close the option menu 240. It will be understood that these options are described herein by way of example, and different combinations and subsets of these and other options may be available in variant embodiments.

In this example, the user has identified a message search option 244, manipulating the track wheel 230 so that the highlight bar 242 settles on that option. The user may then initiate the search by, for example, clicking the track wheel 230 to reveal a search screen 250, as shown in FIG. 6C.

Figure 6C:
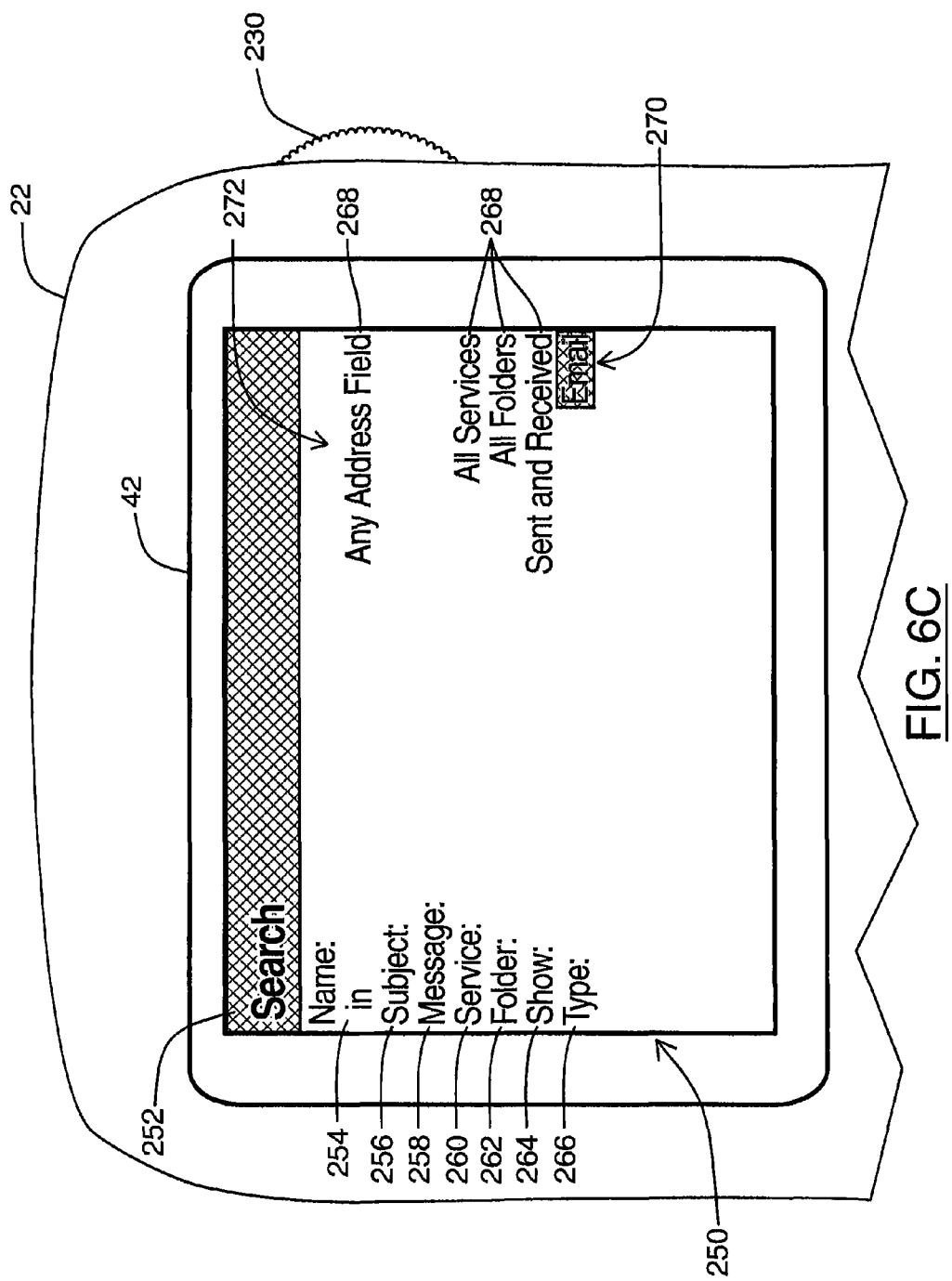

Referring to FIG. 6C, search screen 250 is similar to GUI screen 150 of FIG. 4, except that in the example of FIG. 6C, the subtype parameter option (154 of FIG. 4) is not available to the user.

The display of search screen 250 may include a header 252 with the title "SEARCH" or the like, indicating to the user that he may interact with search screen 250 to specify parameters for a search.

Search options that are made available to a user of device 22 may include, for example: search options 254, 256, 258 where text is to be matched within a specified address field (e.g. the To:, From:, CC: or BCC: field of an e-mail message), subject line, and/or message body respectively when identifying messages; search option 260 where messages received by a particular service (e.g. an e-mail account provider) are to be identified; search option 262 where messages in specified folders are to be searched; search option 264 to indicate whether incoming messages, outgoing messages, or both should be searched; and/or search option 266 that is used when messages of a particular type are to be identified. The messaging application may be configured to display default values 268 for all, some, or none of these options, as shown in the example of FIG. 6C.

With respect to the function provided allowing users to search by a particular message type, in use, the user may modify the value of the search parameters associated with search option 266. By rotating track wheel 230, highlight bar 270 may be re-positioned to highlight different data entry fields 272 for the values of search parameters corresponding to search options (254 to 266) shown in search screen 250. Once the user identifies a specific entry field associated with a corresponding search option, by manipulating the track wheel 230 so that the highlight bar 270 settles on that specific entry field, the user may then take further action in respect of the corresponding search option. For example, the user may click the track wheel 230 when the highlight bar 270 has settled on the entry field associated with search option 266 (i.e. search for messages by type), to reveal an option menu 280 as shown in FIG. 6D.

Figure 6D:
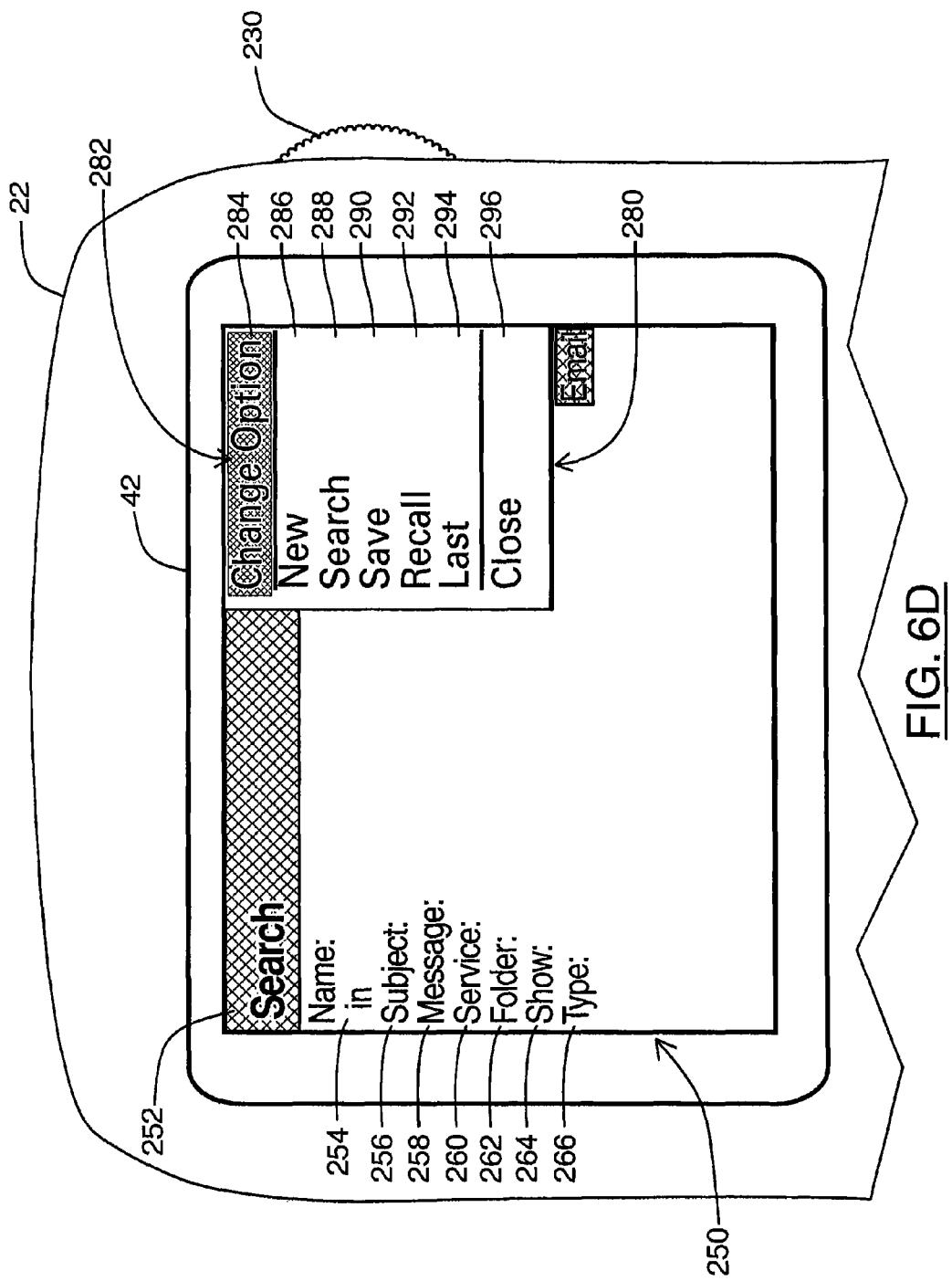

Referring to FIG. 6D, when option menu 280 is shown, by rotating track wheel 230, a highlight bar 282 may be re-positioned to highlight different options within option menu 280. In this example, option menu 280 provides different options that allow users to perform certain operations on the selected search option, or to perform operations not specific to the selected search option. Different options or groups thereof within option menu 280 may be separated by one or more line separators.

For example, options that may be selected by the user from option menu 280 may include: an option 284 to change the value of the parameter as highlighted by highlight bar 270 (FIG. 6C), an option 286 to initiate a new search, an option 288 to execute a search with the currently-set search parameter values, an option 290 to save the currently-set search parameter values as a search in a memory for later recall, an option 292 to recall the search parameter values for a saved search, an option 294 to recall the search parameter values associated with the last search performed by the user, and an option to close the option menu 280. It will be understood that these options are described herein by way of example, and different combinations and subsets of these and other options may be available in variant embodiments.

Figure 6E:
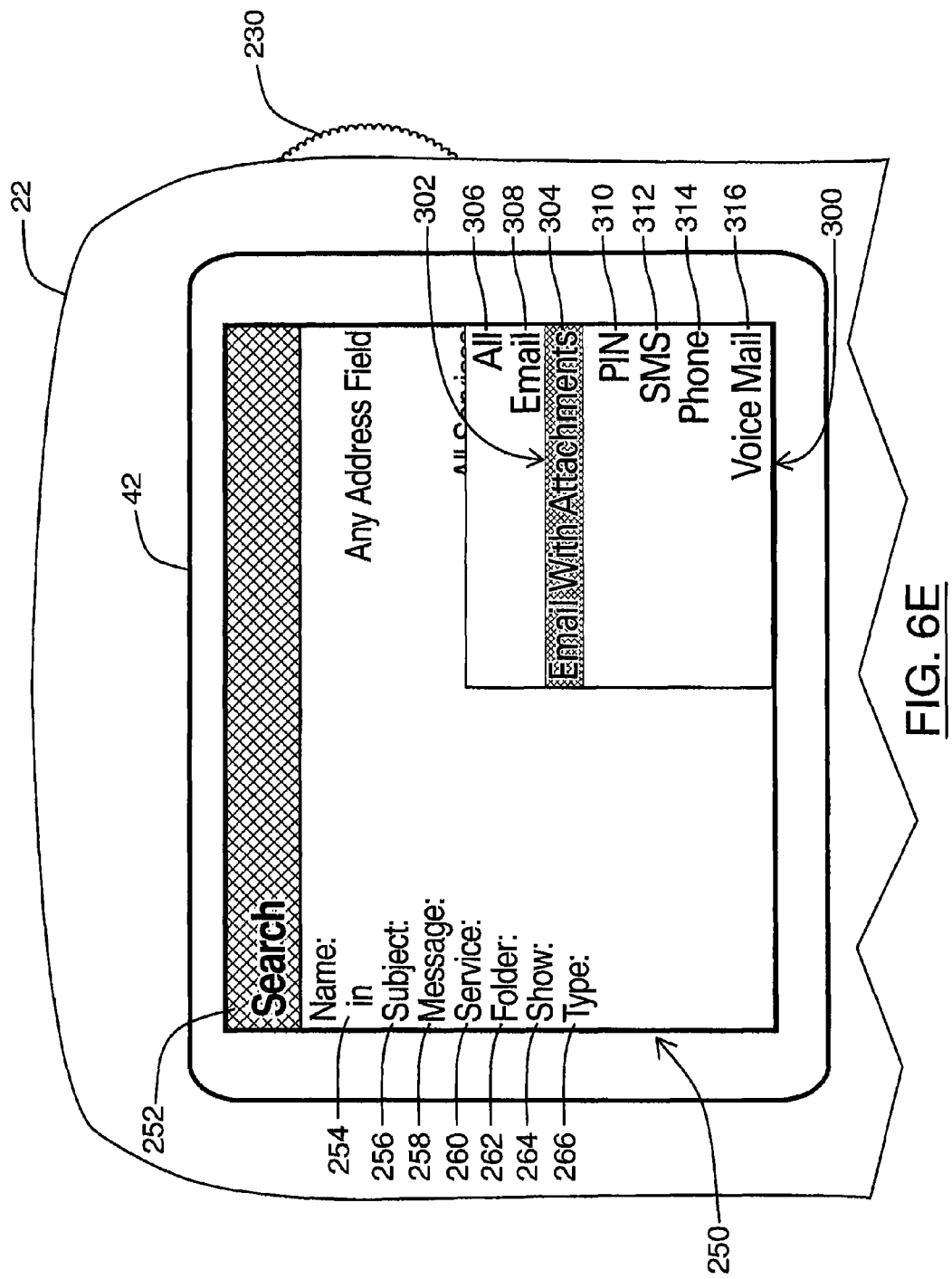

In this example, the user clicks the track wheel 230 when the highlight bar 282 has settled on option 284 to change the value of the parameter as highlighted by highlight bar 270 (FIG. 6C), to reveal a further option menu 280 with message types, as shown in FIG. 6E.

Referring to FIG. 6E, when option menu 300 is shown, by rotating track wheel 230, a new highlight bar 302 may be re-positioned to highlight different options within option menu 300. In this example, option menu 300 allows users to select a message type. In accordance with at least one exemplary embodiment described herein, the user is provided with an "Email with Attachments" option 304 to initiate a search for e-mail messages with attachments. Other message types that may be selected as criteria for searching include, for example, all messages (306) of all types, or more specifically, all e-mail messages (308), all PIN messages (310), all SMS messages (312), all phone messages (314), all voice mail messages (316). It will be understood that these types are described herein by way of example, and different combinations and subsets of these and other types may be made available for searching in variant embodiments. It will be understood that any search by a specific message type that may be executed will also be subject to the values of the parameters of other search options, as the search parameters of search screen 250 are cumulative. Accordingly, if other search parameters are specified (e.g. associated with options 254-264), they would also need to be met in respect of each message returned by the search.

Figure 6F:
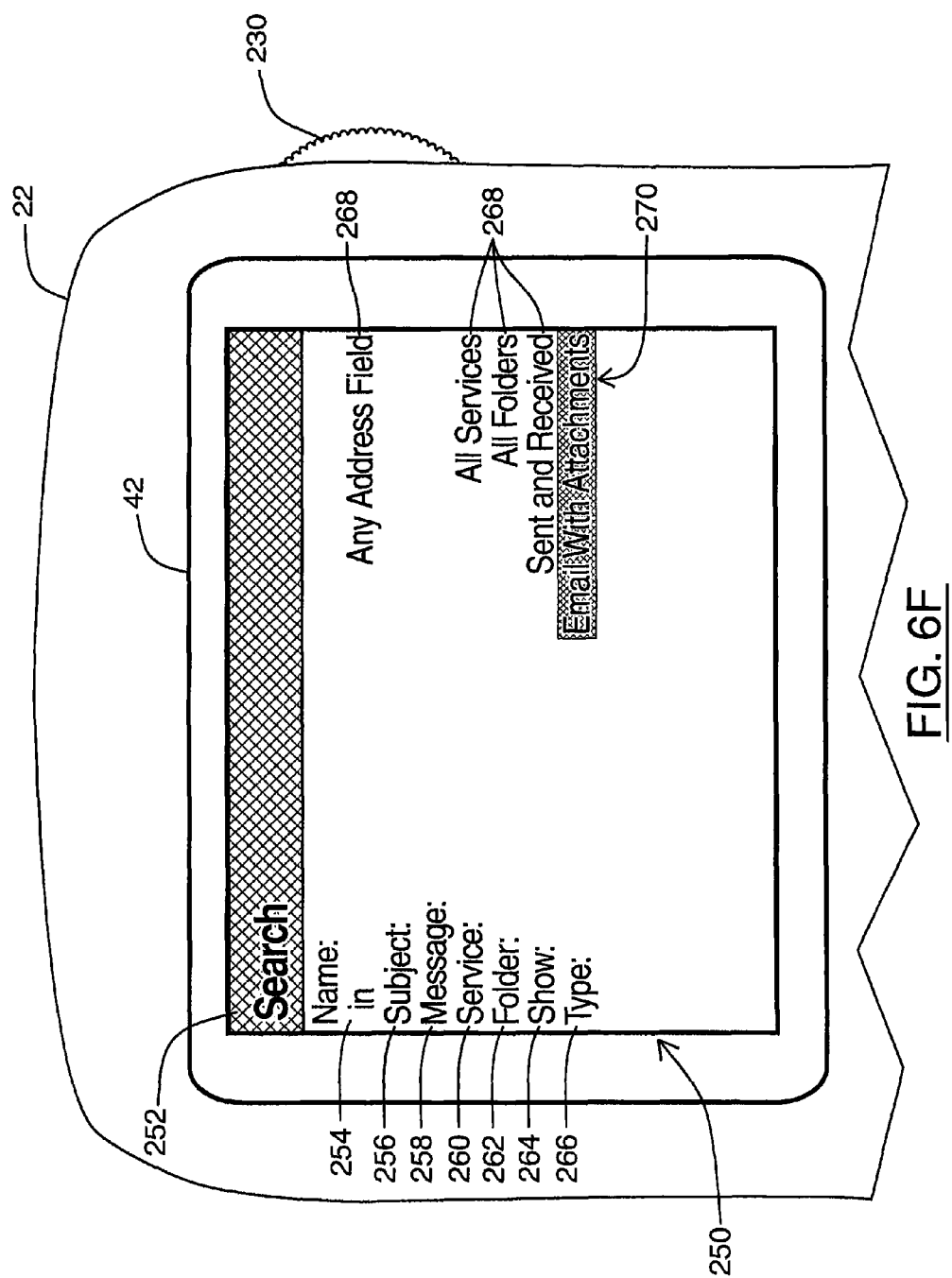

In this example, the user clicks the track wheel 230 when the highlight bar 302 has settled on the "Email with Attachments" option 304, and the selection is reflected on search screen 250, as shown in FIG. 6F. The user then clicks the track wheel 230 to reveal an option menu 280, as shown in FIG. 6G.

Figure 6G:
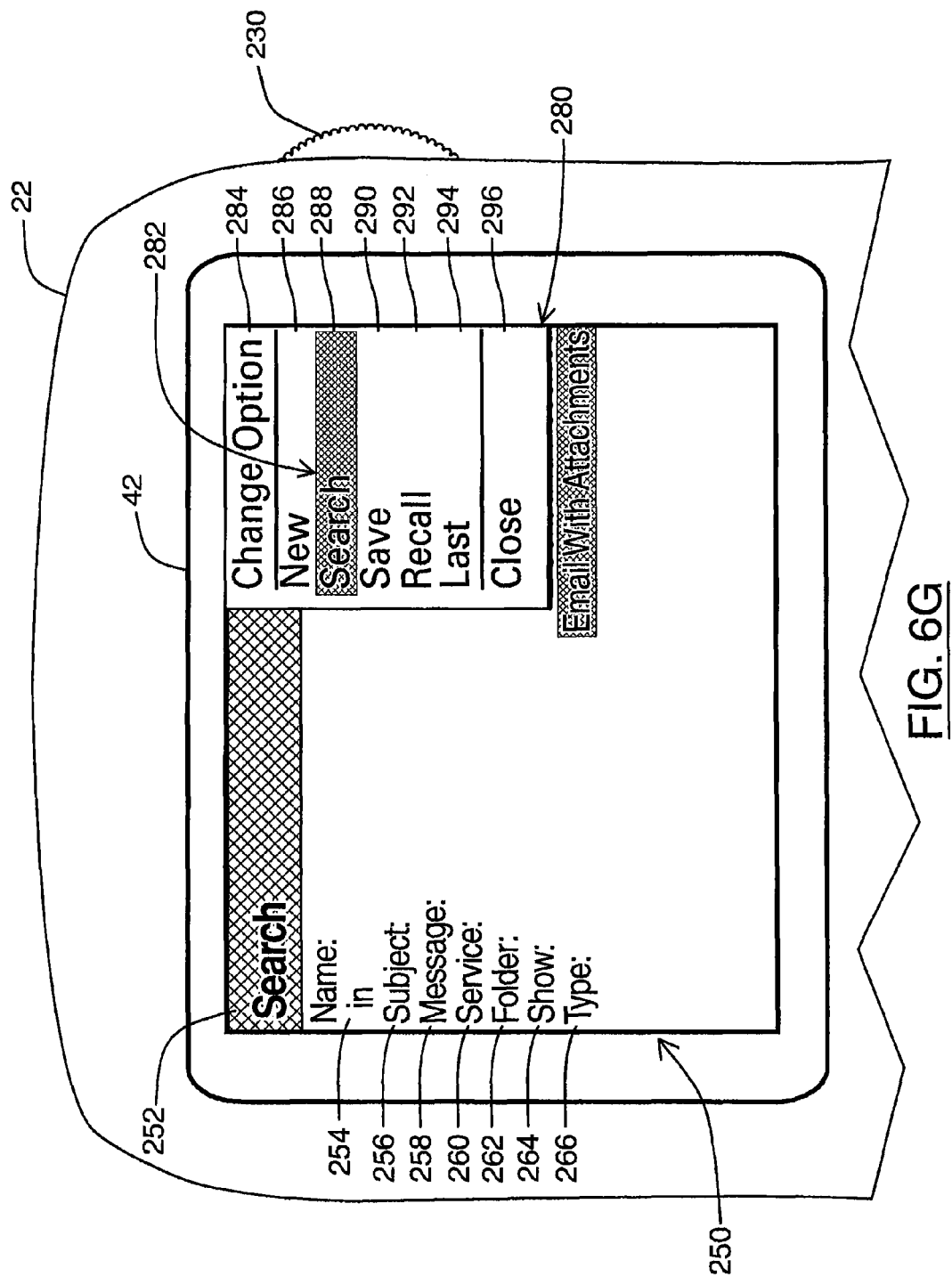

Referring to FIG. 6G, the user has rotated the track wheel 230 to re-position highlight bar 282. The option 288 to execute a search with the currently-set search parameter values in option menu 280 is highlighted. In this example, the user clicks the track wheel 230 to initiate the search for e-mails with attachments from the messages for which details are displayed in the message list 200 of FIG. 6A.

Figure 6H:
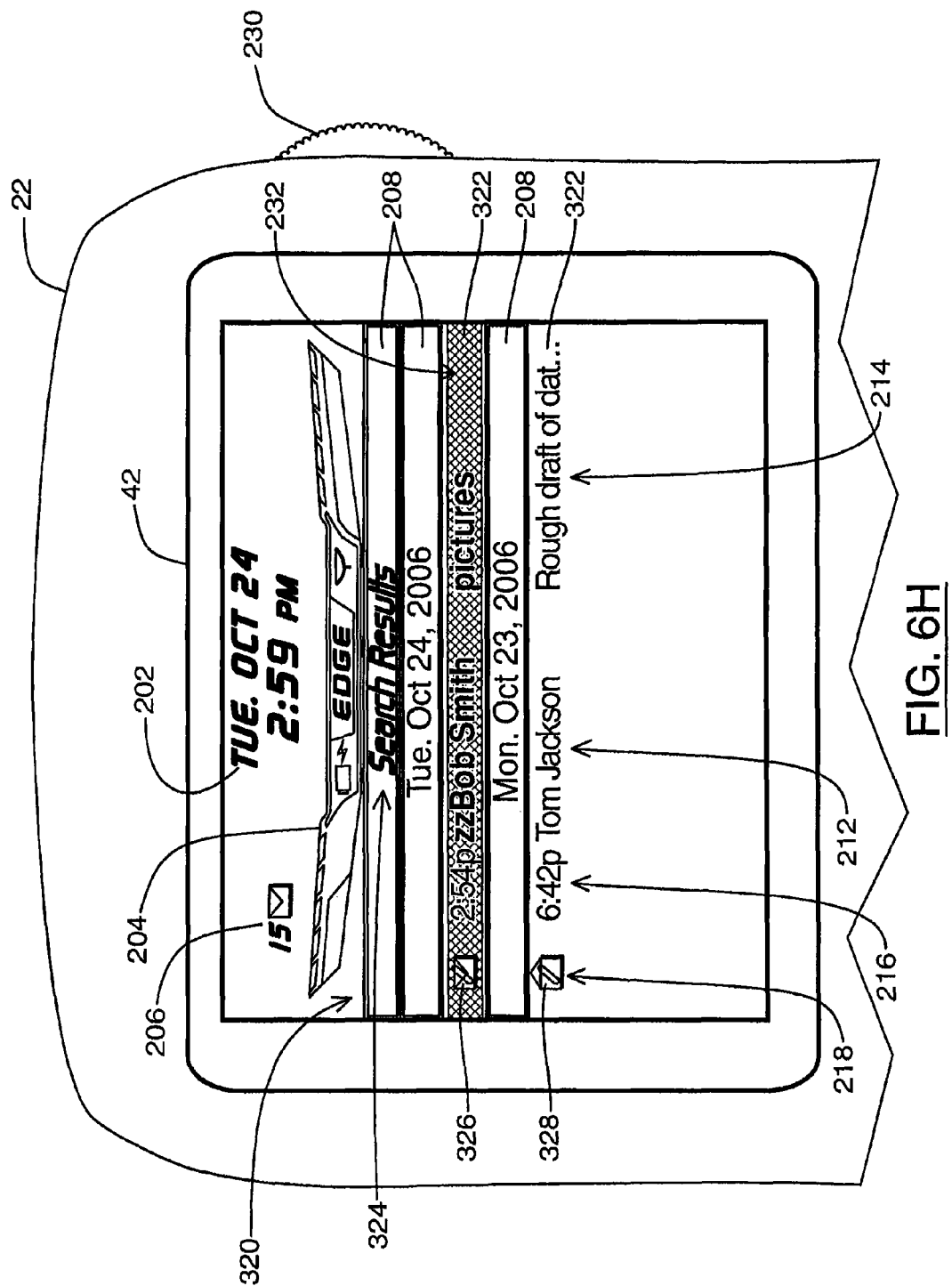

Referring to FIG. 6H, a search result screen 320 displayed by the messaging application in the display 42 of device 22 is shown. In this example, search result screen 320 displays the result of the search for e-mails by attachments, as initiated by the user through the actions described with reference to FIGS. 6A to 6G. Each message that has been located in the search that satisfies the search criteria input by the user is associated with a search result entry 322, as selected from messages associated with the list entries 210 of message list 200.

In one embodiment, a header 324 or other indication that search results are being returned, is displayed in a banner 208. Other banners 208 may be used to display other information, such as the date that the messages that are returned by the search and are grouped under the respective banner were sent or received, for example.

It is noted that for each search result entry 322 in this example, a paperclip graphic appears in each icon displayed in detail column 218, as each message associated with the search result entry 322 contains an attachment. The icon may be an unopened envelope icon with a paperclip 326, indicating that the corresponding message with one or more attachments has not yet been read. The icon may be an opened envelope icon with a paperclip 328, indicating that the corresponding message with one or more attachments has already been read.

The features described with reference to FIGS. 6A and 6H are described in combination by way of example only. The features may be provided independently and/or in other combinations in variant implementations.

Figure 7:
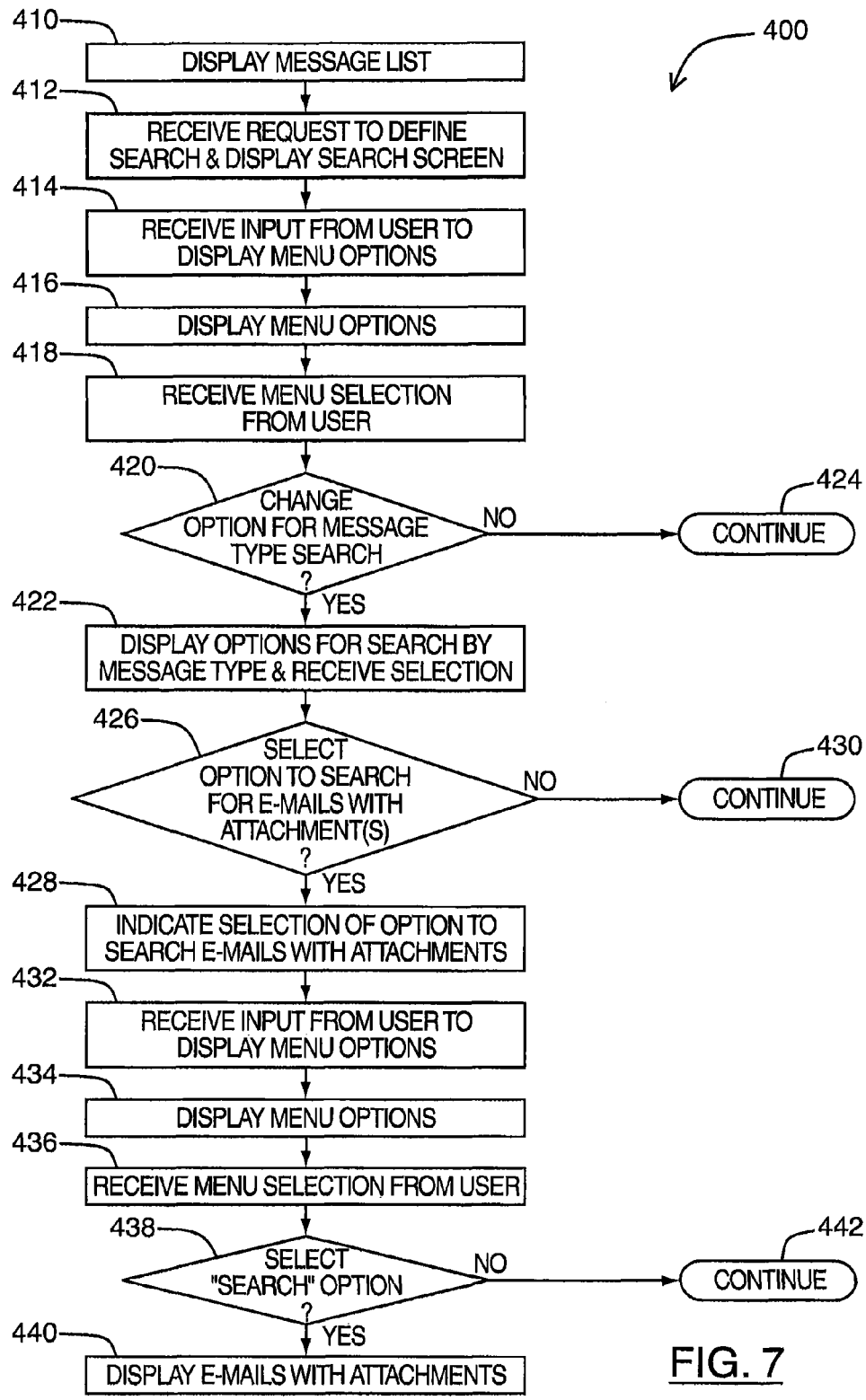
FIG. 7 is a flowchart illustrating steps of a method of searching for messages with attachments on the wireless communication device of FIG. 2 in at least one embodiment.

Referring now to FIG. 7, a flowchart illustrating steps of a method of searching for messages with attachments in at least one embodiment is shown generally as 400.

Some of the features described with reference to FIG. 7 have been described earlier in this description, and the reader is directed to the relevant paragraphs therein for additional details in respect of method 400. In one embodiment, the steps of method 400 are performed by an application, such as a messaging application, executing on a wireless communication device (e.g. device 22 of FIG. 1).

At step 410, a message list is displayed in a display screen (e.g. display 42 of FIG. 2) of the wireless communication device. Typically, in a message list view, the message list provides a summary of all messages (e.g. e-mail messages) in one or more message folders, subject to available space in the display.

For example, the message list may provide a summary of all e-mail messages in the "Inbox" folder on the wireless communication device. When the folder is not empty, the message list will comprise at least one list entry. Each list entry provides details of a message in the "Inbox" folder. At least some of the details will typically be extracted from the message header of the respective message. The types of information shown in a list entry may be user-configurable.

Given the relatively small size of display screens typically associated with mobile devices, the message list may be displayed in a message list view that occupies the entire display screen. However, the message list may alternatively be displayed in an area that partially occupies the display screen.

The user will typically be provided with a selection means, such as a highlight bar, a pointer, a cursor, or other means, to identify and select list entries in the message list. This selection means may be re-positioned at the direction of the user, using an input device such as a track wheel, track ball, keyboard, mouse, or other input device.

At step 412, a request from the user to define a search is received. In one embodiment, the user selects a "search" option from a menu that may be accessed by clicking a track wheel when viewing details in the message list in order to submit the request. A search screen is displayed in response to the request. The user may, for example, manipulate a track wheel to reposition a highlight bar or other selection means, such that a data input field associated with a specific search option is highlighted in the search screen.

At step 414, a request from the user to display menu options from within the search screen is received. In one embodiment, these menu options may be accessed by clicking a track wheel when viewing details in the search screen displayed at step 412. The menu options are displayed to the user at step 416.

At step 418, a menu selection is received from the user. If the menu selection indicates that the user has selected a "change option" item from the menu and the field associated with a message type has been highlighted or otherwise selected by the user as determined at step 420, this means that the user wishes to change the options for a search by message type, and the flow of method steps proceeds to step 422 where options for searching by message type are displayed. Otherwise, the flow of method steps proceeds to step 424 where the menu selection is further processed in known manner.

At step 422, different message types are displayed to the user in a menu. A selection of a message type from the options displayed to the user is then received. In one embodiment, a selection is made by manipulating the track wheel to reposition a highlight bar or other selection means, such that a specific message type is highlighted, and subsequently clicking the track wheel.

If the message type selection indicates that the user has selected an "Email with Attachments" item from the menu as determined at step 426, this means that the user wishes to search for messages with one or more attachments, and the flow of method steps proceeds to step 428 where the search screen is modified to indicate that the option to search for e-mail messages with attachments has been selected. Otherwise, the flow of method steps proceeds to step 430 where the message type selection is further processed in known manner.

At step 432, a request from the user to display menu options from within the search screen is received. In one embodiment, these menu options may be accessed by clicking a track wheel when viewing details in the search screen. The menu options are displayed to the user at step 434.

At step 436, a menu selection is received from the user. If the menu selection indicates that the user has selected a "search" item from the menu, this means that the user wishes to initiate the search with the currently-set parameters. For example, the user may have defined values for the search parameters such that all e-mail messages with one or more attachments are to be returned by the search. In this case, the flow of method steps proceeds to step 440 at which search result entries identifying e-mail messages with attachments are displayed in a search result screen to the user. Otherwise, the flow of method steps proceeds to step 442 where the menu selection received at step 436 is further processed in known manner.

Although embodiments have been described herein that relate to the searching of e-mail messages with attachments, one or more features described herein may be implemented such that other types of messages with attachments may be searched, in variant embodiments.

The steps of a method of searching for messages with attachments in embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of searching for messages with attachments on a mobile device, wherein each of said messages comprises at least one attachment that is provided to the mobile device in chunks in response to user-initiated requests from the mobile device, the method comprising:
displaying a plurality of search parameters in a search screen, wherein one of said plurality of search parameters is associated with an option to search for messages of a specified type on the mobile device;
receiving a user request to modify the value of the search parameter associated with the option to search for messages of a specified type;
displaying a first plurality of user-selectable options in response to the user request, wherein the first plurality of user-selectable options comprises an option to search for messages to identify messages having one or more attachments;
determining whether the option to search for messages to identify messages having one or more attachments is user-selected;
displaying a second plurality of user-selectable options if the option to search for messages to identify messages having one or more attachments is user-selected, wherein the second plurality of user-selectable options comprises an option to search for messages to identify messages having one or more attachments that have been previously viewed;
determining whether the option to search for messages to identify messages having one or more attachments that have been previously viewed is user-selected;
executing a message search if the option to search for messages to identify messages having one or more attachments that have been previously viewed is user-selected; and
displaying results of the message search in a search results screen, wherein the results identify one or more located messages, wherein each of the one or more located messages has one or more attachments that have been at least partially displayed on a display of the mobile device or at least partially played on a speaker of the mobile device.

2. The method of claim 1, wherein the plurality of search parameters is displayed in a menu.

3. The method of claim 1, wherein the first plurality of user-selectable options is displayed in a menu within the search screen.

4. The method of claim 3, wherein the second plurality of user-selectable options is displayed in a submenu within the search screen.

5. The method of claim 1, wherein the second plurality of user-selectable options comprises a first option to search for messages to identify messages having one or more attachments that have been previously viewed, a second option to search for messages to identify messages having one or more attachments that have not been previously viewed, and a third option to search for messages to identify all messages having one or more attachments.

6. A physical computer-readable storage medium on which a plurality of executable instructions is stored, the instructions for performing a method of searching for messages with attachments on a mobile device, the method comprising:
displaying a plurality of search parameters in a search screen, wherein one of said plurality of search parameters is associated with an option to search for messages of a specified type on the mobile device;
receiving a user request to modify the value of the search parameter associated with the option to search for messages of a specified type;
displaying a first plurality of user-selectable options in response to the user request, wherein the first plurality of user-selectable options comprises an option to search for messages to identify messages having one or more attachments;
determining whether the option to search for messages to identify messages having one or more attachments is user-selected;
displaying a second plurality of user-selectable options if the option to search for messages to identify messages having one or more attachments is user-selected, wherein the second plurality of user-selectable options comprises an option to search for messages to identify messages having one or more attachments that have been previously viewed;
determining whether the option to search for messages to identify messages having one or more attachments that have been previously viewed is user-selected;
executing a message search if the option to search for messages to identify messages having one or more attachments that have been previously viewed is user-selected; and
displaying results of the message search in a search results screen, wherein the results identify one or more located messages, wherein each of the one or more located messages has one or more attachments that have been at least partially displayed on a display of the mobile device or at least partially played on a speaker of the mobile device.

7. The medium of claim 6, wherein the plurality of search parameters is displayed in a menu.

8. The medium of claim 6, wherein the first plurality of user-selectable options is displayed in a menu within the search screen.

9. The medium of claim 8, wherein the second plurality of user-selectable options is displayed in a submenu within the search screen.

10. The medium of claim 6, wherein the second plurality of user-selectable options comprises a first option to search for messages to identify messages having one or more attachments that have been previously viewed, a second option to search for messages to identify messages having one or more attachments that have not been previously viewed, and a third option to search for messages to identify all messages having one or more attachments.

11. A system for searching messages with attachments on a mobile device, wherein the system comprises:
- a processor;
- a memory; and
- a display screen;
- wherein the processor is configured to:
- display a plurality of search parameters in a search screen, wherein one of said plurality of search parameters is associated with an option to search for messages of a specified type on the mobile device;
- receive a user request to modify the value of the search parameter associated with the option to search for messages of a specified type;
- display a first plurality of user-selectable options in response to the user request, wherein the first plurality of user-selectable options comprises an option to search for messages to identify messages having one or more attachments;
- determine whether the option to search for messages to identify messages having one or more attachments is user-selected;
- display a second plurality of user-selectable options if the option to search for messages to identify messages having one or more attachments is user-selected, wherein the second plurality of user-selectable options comprises an option to search for messages to identify messages having one or more attachments that have been previously viewed;
- determine whether the option to search for messages to identify messages having one or more attachments that have been previously viewed is user-selected;
- execute a message search if the option to search for messages to identify messages having one or more attachments that have been previously viewed is user-selected; and
- display results of the message search in a search results screen, wherein the results identify one or more located messages, wherein each of the one or more located messages has one or more attachments that have been at least partially displayed on a display of the mobile device or at least partially played on a speaker of the mobile device.

12. The system of claim 11, wherein the plurality of search parameters is displayed in a menu.

13. The system of claim 11, wherein the first plurality of user-selectable options is displayed in a menu within the search screen.

14. The system of claim 13, wherein the second plurality of user-selectable options is displayed in a submenu within the search screen.

15. The system of claim 11, wherein the second plurality of user-selectable options comprises a first option to search for messages to identify messages having one or more attachments that have been previously viewed, a second option to search for messages to identify messages having one or more attachments that have not been previously viewed, and a third option to search for messages to identify all messages having one or more attachments.

\* \* \* \* \*